United States Patent
Inoue et al.

(10) Patent No.: US 7,493,443 B2
(45) Date of Patent: Feb. 17, 2009

(54) STORAGE SYSTEM UTILIZING IMPROVED MANAGEMENT OF CONTROL INFORMATION

(75) Inventors: Naoki Inoue, Odawara (JP); Yasuyuki Nagasoe, Kaisei (JP)

(73) Assignee: Hitachi, Ltd., Tokyo (JP)

( * ) Notice: Subject to any disclaimer, the term of this patent is extended or adjusted under 35 U.S.C. 154(b) by 340 days.

(21) Appl. No.: 11/593,188

(22) Filed: Nov. 6, 2006

(65) Prior Publication Data

US 2008/0065829 A1 Mar. 13, 2008

(30) Foreign Application Priority Data

Sep. 8, 2006 (JP) ............................. 2006-244683

(51) Int. Cl.
*G06F 12/00* (2006.01)
(52) U.S. Cl. ............................. 711/112; 711/4; 711/156
(58) Field of Classification Search ................. 711/112, 711/4, 156
See application file for complete search history.

(56) References Cited

U.S. PATENT DOCUMENTS

| | | | | |
|---|---|---|---|---|
| 6,810,462 | B2 * | 10/2004 | Matsunami et al. | 711/112 |
| 7,096,317 | B2 * | 8/2006 | Inoue et al. | 711/114 |
| 7,231,491 | B2 * | 6/2007 | Matsunami et al. | 711/112 |
| 7,310,702 | B2 * | 12/2007 | Yamagami | 711/112 |
| 2003/0204671 | A1 * | 10/2003 | Matsunami et al. | 711/112 |
| 2005/0154828 | A1 | 7/2005 | Sugino et al. | |
| 2005/0204096 | A1 | 9/2005 | Shimada | |
| 2006/0230222 | A1 * | 10/2006 | Yamagami | 711/4 |

FOREIGN PATENT DOCUMENTS

| | | |
|---|---|---|
| JP | 2005-196673 | 1/2004 |
| JP | 2005-258918 | 3/2004 |

* cited by examiner

*Primary Examiner*—Stephen C Elmore
(74) *Attorney, Agent, or Firm*—Reed Smith LLP; Juan Carlos A. Marquez

(57) ABSTRACT

A storage system includes operational control information stored in RAID disk drives for higher access performance over the case where control information is stored in shared memory. The operational control information includes monitor information, log information, and copy difference management information.

15 Claims, 21 Drawing Sheets

FIG.3

| DATA SLOT NUMBER (60A) | ATTRIBUTE INFORMATION (60B) |
|---|---|
| 0 | CONTROL INFORMATION |
| 1 | HOST DATA |
| 2 | CONTROL INFORMATION |
| ⋮ | ⋮ |

| ATTRIBUTE INFORMATION (61A) | DATA SLOT QUANTITY (61B) | MAXIMUM DATA SLOT QUANTITY (61C) |
|---|---|---|
| CONTROL INFORMATION | 2 | 500 |
| HOST DATA | 3 | 500 |

| | 52X | 52Y | 52Z | |
|---|---|---|---|---|
| | PAGE NUMBER | GENERATION NUMBER | UPDATE DATE AND TIME | |
| | 0 | 2 | 200X/0Y/0Z 23:01:00 | ~520 |
| | 1 | 0 | 200X/0Y/0Z 21:00:00 | ~520 |
| | 2 | 1 | 200X/0Y/0Z 22:30:00 | ~520 |
| | ⋮ | ⋮ | ⋮ | |

52A

STORAGE SYSTEM UTILIZING IMPROVED MANAGEMENT OF CONTROL INFORMATION

CROSS-REFERENCES TO RELATED APPLICATIONS

This application relates to and claims priority from Japanese Patent Application No. 2006-244683, filed on Sep. 8, 2006, the entire disclosure of which is incorporated herein by reference.

BACKGROUND

1. Field of the Invention

The present invention relates to a storage system, a storage system control method, and a storage controller. In particular, this invention is suited for use for a storage system having a storage controller.

2. Description of Related Art

These days in storage systems that deal with data on a large-scale, it is necessary to extend the functionality of the storage system itself and increase the number of logical volumes (hereinafter referred to as "logical volumes") formed in physical storage areas provided by multiple hard disk devices arranged in arrays, in order to store massive amounts of data that increase from day to day in the multiple hard disk devices. Accordingly, the amount of control information for controlling the storage system has also increased. It has therefore become necessary to take measures to increase the capacity of the shared memory required to store the control information.

However, if the power for a storage system that has a backup function stops, the control information stored in the shared memory will be lost after a certain period of time has elapsed. In order to prevent such loss of control information, the control information is stored, not in the shared memory, but in nonvolatile semiconductor memory or hard disk drives mounted on a service processor.

JP-A-2005-196673 discloses a technique for storing operation information, such as operation rates and operation times for a storage system, on multiple hard disk drives configured to be operated according to RAID (Redundant Array of Independent/Inexpensive Disks) methodology. Also, JP-A-2005-258918 discloses a technique for hierarchizing cache memory in a storage system and storing host data from a host computer in the cache memory.

It is necessary to increase the capacity of the shared memory in order to extend the functionality of the storage system itself or to increase the number of logical volumes. However, there is the problem of high cost, because shared memory is expensive.

If the control information is stored in semiconductor memory instead of shared memory, the control information will not be lost, but the amount of control information stored in the semiconductor memory will be less than the amount of control information stored in the shared memory. Accordingly, if the same amount of control information as that stored in the shared memory were to be stored in the semiconductor memory, the semiconductor memory itself would be too expensive.

If the control information is stored in hard disk drives mounted on a service processor, instead of in the shared memory, since not many hard disk drives are configured to be operated according to the RAID system, it is difficult to restore the control information stored in the hard disk drives if a failure should occur in the hard disk drives.

Furthermore, if the control information is stored in any storage device other than the shared memory of the storage system, that storage device needs to have access performance equal to or better than the shared memory.

SUMMARY

This invention was devised in light of the circumstances described above. It is an object of the invention to provide a storage system, a method for controlling the storage system, and a storage controller, wherein control information is stored in hard disk drives that are operated according to RAID and are less expensive than shared memory, and wherein higher access performance can be achieved than in the case where data is stored in the shared memory.

In order to the achieve the above-described object, according to an aspect of the invention, a storage system including a host system for making a data read/write request, and a storage controller for storing data from the host system is provided. The storage controller includes: a channel adapter that is a communication interface with the host system; and shared memory connected to the channel adapter. The shared memory includes a shared storage unit for storing control information for controlling the storage controller. The channel adapter includes: a first storage unit for storing, as one or more sets of first control information from among the control information, either the control information that should be stored in the event the storage controller stops, or the control information that exceeds the capacity of the shared storage unit and cannot be stored in the shared storage unit; a first search unit for searching for necessary first control information in the one or more sets of first control information stored in the first storage unit; and a processor for executing corresponding control processing based on the first control information found by the first search unit.

As a result, the most recent control information is stored in the first storage unit in the channel adapter, and the processor in the channel adapter can immediately read necessary control information and supply it to the host system.

According to another aspect of the invention, a method for controlling a storage system including a host system for making a data read/write request, and a storage controller for storing data from the host system is provided. The storage controller includes a channel adapter that is a communication interface with the host system, and shared memory connected to the channel adapter. The shared memory includes a shared storage unit for storing control information for controlling the storage controller. The channel adapter includes a first storage unit for storing, as one or more sets of first control information from among the control information, either the control information that should be stored in the event the storage controller stops, or the control information that exceeds the capacity of the shared storage unit and cannot be stored in the shared storage unit. The storage system control method includes a first search step of searching for necessary first control information in the one or more sets of first control information stored in the first storage unit; and an execution step of executing corresponding control processing based on the first control information found in the first search step.

As a result, the most recent control information is stored in the channel adapter, and the processor in the channel adapter can immediately read necessary control information and supply it to the host system.

According to another aspect of the invention, a storage controller for storing data from a host system for making a data read/write request is provided. The storage controller includes: a channel adapter that is a communication interface with the host system; and shared memory connected to the channel adapter. The shared memory includes a shared storage unit for storing control information for controlling the storage controller. The channel adapter includes: a first storage unit for storing, as one or more sets of first control information from among the control information, either the control information that should be stored in the event the storage controller stops, or the control information that exceeds the capacity of the shared storage unit and cannot be stored in the shared storage unit; a first search unit for searching for necessary first control information in the one or more sets of first control information stored in the first storage unit; and a processor for executing corresponding control processing based on the first control information found by the first search unit.

As a result, the most recent control information is stored in the first storage unit in the channel adapter, and the processor in the channel adapter can immediately read necessary control information and supply it to the host system.

According to aspects of the invention, the control information can be stored in inexpensive hard disk drives which are operated according to RAID, and the control information can be retained in the event the power for the storage system stops.

Moreover, since the control information is stored in the hard disk drives and also stored as a buffer, in local memory of the channel adapter, higher access performance can be achieved than in the case where the control information is stored in the shared memory.

BRIEF DESCRIPTION OF THE DRAWINGS

FIG. 3 shows an attribute information management table according to the embodiment.

FIG. 4 shows a data slot management table according to the embodiment.

FIG. 5 shows a generation management information table according to the embodiment.

DETAILED DESCRIPTION OF PREFERRED EMBODIMENTS

An embodiment of this invention will be described with reference to the attached drawings.

(1) Configuration of Storage System According to this Embodiment

A storage system according to this embodiment will be described below.

Figure 1:
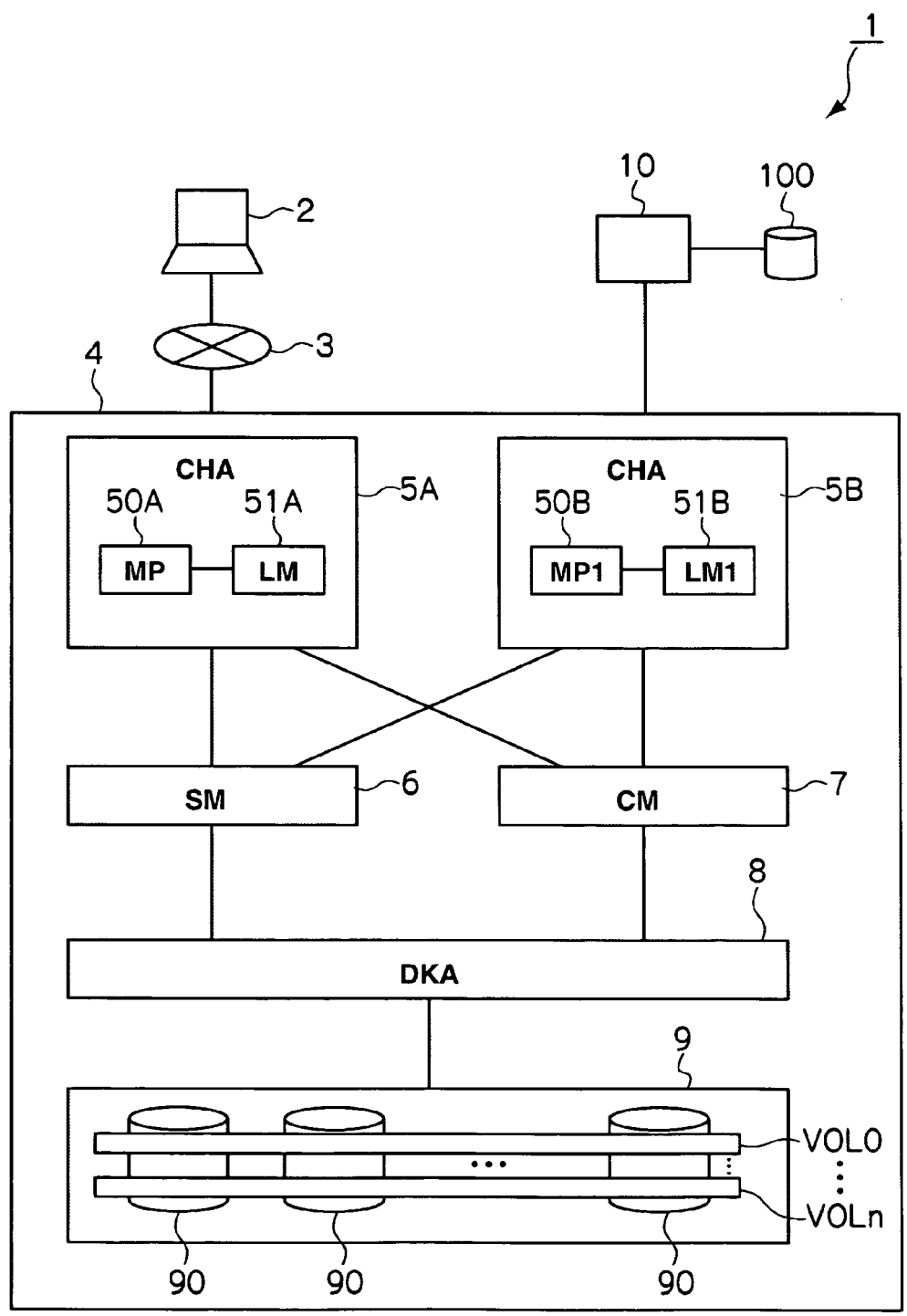
FIG. 1 is a block diagram of the entire configuration of a storage system according to an embodiment of the invention.

In FIG. 1, reference numeral "1" indicates the storage system according to this embodiment. This storage system 1 is configured so that a host computer 2 is connected via a network 3 to a storage apparatus 4, and the storage apparatus 4 is connected to a service processor 10.

The host computer 2 is a computer system equipped with information processing resources such as a CPU (Central Processing Unit) and memory. Specific examples of the host computer 2 include a personal computer, a workstation, and a mainframe. The host computer 2 includes: information input devices (not shown in the drawing) such as a keyboard, a switch, a pointing device, and/or a microphone; and information output devices (not shown in the drawing) such as a monitor display and/or speakers.

The network 3 is composed of, for example, a SAN (Storage Area Network), a LAN (Local Area Network), the Internet, public line(s), or private line(s). Communication between the host computer 2 and the storage apparatus 4 via the network 3 is conducted according to Fibre Channel Protocol (FCP) when the network 3 is a SAN, or according to Transmission Control Protocol/Internet Protocol (TCP/IP) when the network 3 is a LAN.

The storage apparatus 4 includes channel adapters 5A and 5B, shared memory 6, cache memory 7, a disk adapter unit 8, and a hard disk drive unit 9. Data and commands are sent and received between the channel adapters 5A and 5B, the shared memory 6, the cache memory 7, and the disk adapter unit 8 via, for example, a bus or a switch like a very high speed crossbar switch for transmitting data by means of high-speed switching.

Each channel adapter 5A/5B is configured as a microcomputer system equipped with, for example, a microprocessor 50A/50B, local memory 51A/51B, and a communication interface and has a port (not shown in the drawing) for connection to the network 3. The channel adapters 5A and 5B interpret various commands sent from the host computer 2 and execute the required processing. The each channel adapter 5A/5B port is given a network address (such as an Internet Protocol [IP] address or a World Wide Name [WWN]) to identify itself. Accordingly, each channel adapter 5A/5B can individually act as NAS (Network Attached Storage).

The shared memory 6 is storage memory shared by the channel adapters 5A and 5B and the disk adapter unit 8. The shared memory 6 is mainly used to store system configuration information and various control programs that are read from system volumes when the power of the storage apparatus 4 is turned on, as well as commands from the host computer 2.

The cache memory 7 is also storage memory shared by the channel adapters 5A and 5B and the disk adapter unit 8. This cache memory 7 is mainly used to temporarily store user data input to or output from the storage apparatus 4.

The disk adapter unit 8 is composed of a plurality of disk adapters (not shown in the drawing). The disk adapter unit 8 is configured as a microcomputer system equipped with a microprocessor and memory, and functions as an interface for controlling protocol when communicating with the hard disk drive unit 9. The disk adapter unit 8 is connected to the hard disk drive unit 9 via, for example, a Fibre Channel cable, and sends/receives data to/from the hard disk drive unit 9 according to Fibre Channel Protocol.

The hard disk drive unit 9 is composed of a plurality of hard disk drives 90, for example, expensive hard disk drives 90 like SCSI (Small Computer System Interface) disks, or inexpensive hard disk drives 90 like SATA (Serial AT Attachment) disks.

One or more logical volumes VOL0 to VOLn are defined in physical storage areas provided by these hard disk drives 90. Data from the host computer 2 is written in blocks of predetermined size to the logical volumes VOL0 to VOLn and data in the logical volumes VOL0 to VOLn is read in blocks of predetermined size by the host computer 2.

Each logical volume VOL0 to VOLn is given its own unique identifier (LUN: Logical Unit Number). In this embodiment, user data input and output is conducted by designating, as an address, a combination of the above-mentioned identifier and a unique block number (LBA: Logical Block Address) assigned to each block.

The service processor 10 is a server computer device operated for maintenance and management of the storage apparatus 4 and is composed of, for example, a notebook personal computer. The service processor 10 can monitor the occurrence of a failure in the storage apparatus 4 and display it on its display screen (not shown in the drawing). The service processor 10 includes one or more hard disk drives 100.

If the host computer 2 makes a data write request to the storage system 1 that has the above-described structure, data is temporarily stored in the cache memory 7 via the channel adapters 5A and 5B. Then, the microprocessor in the disk adapter unit 8 recognizes, via the shared memory 6, information that the data was temporarily written to the cache memory 7. Subsequently, the microprocessor in the disk adapter unit 8 acquires the data from the cache memory 7 and writes it to the hard disk drives 90 in the hard disk drive unit 9. On the other hand, if the host computer 2 makes a data read request, the microprocessor in the disk adapter unit 8 reads data from the hard disk drive 90, and the data is then sent via the cache memory 7 and the channel adapters 5A and 5B to the host computer 2.

(2) Storage System Control Information According to this Embodiment (2-1) Control Information Next, control information for controlling the storage system 1 according to this embodiment will be explained.

This storage system 1 is characterized in that the control information for controlling the storage system 1 is stored in the logical volumes VOL0 to VOLn, and also in the local memory 51A and 51B of the channel adapters 5A and 5B.

The control information according to this embodiment means: control information that should be retained, but that would be lost and, as a result, affect continuous operation of the entire storage system 1 if it were stored in volatile shared memory 6 and the power of the storage apparatus 4 were turned off; and a massive amount of control information that exceeds the capacity of the shared memory 6 and cannot be stored in the shared memory 6.

Specific examples of the control information include monitor information, log information, and copy difference management information.

The control information according to this embodiment excludes control information required to boot up the storage apparatus 4; for example, capacity information about the shared memory 6, capacity information about the cache memory 7, and activation information about the hard disk drives 90. Such control information is stored in the shared memory 6. Accordingly, all the control information stored in the shared memory 6 is not always stored in the logical volumes VOLn.

Figure 2:
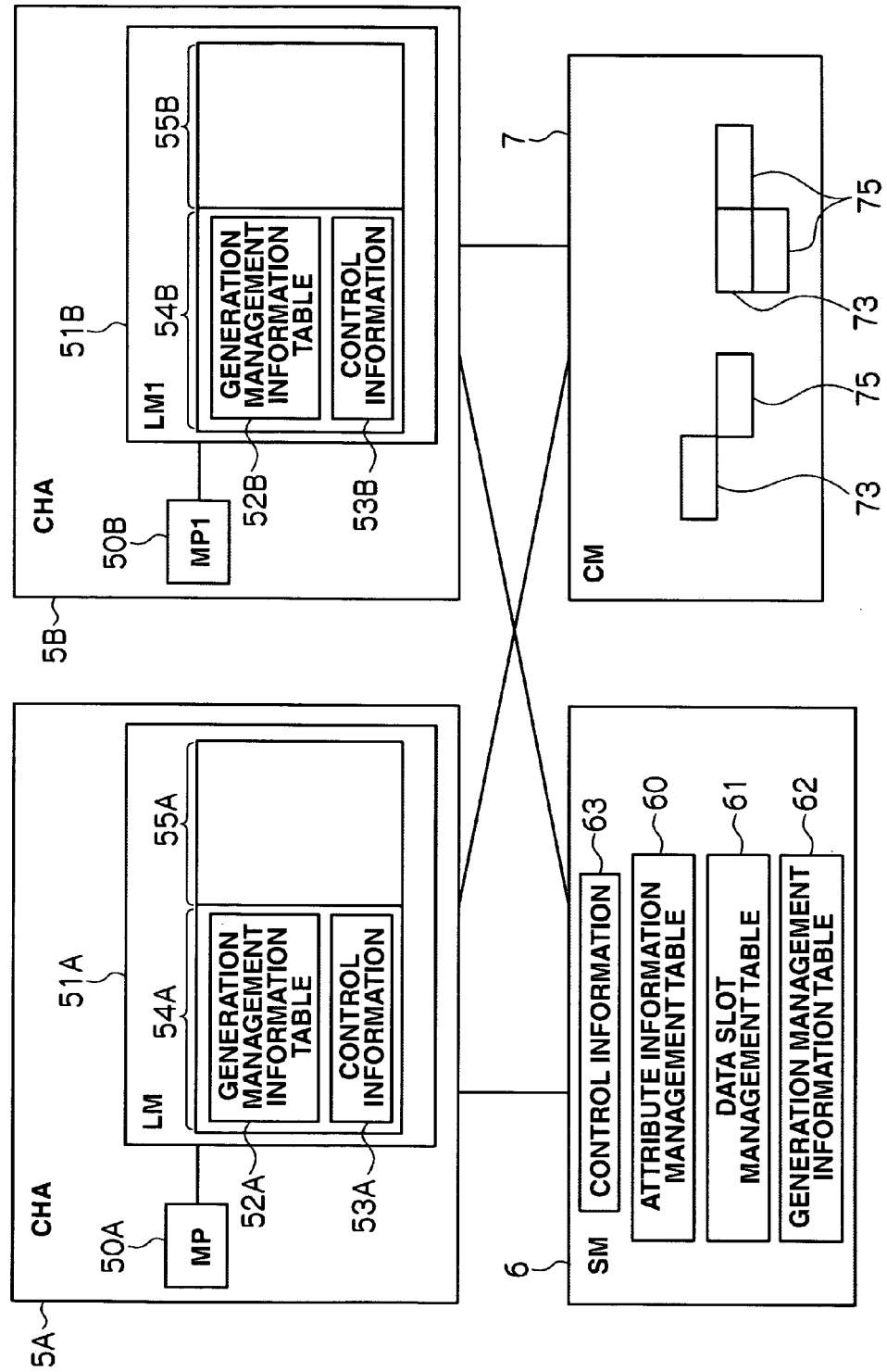
FIG. 2 is a block diagram showing part of the configuration of the storage system according to the embodiment.

FIG. 2 is a block diagram showing part of the storage system 1, i.e., the relationship between the channel adapters 5A and 5B, the shared memory 6, and the cache memory 7.

The local memory 51A/51B of the channel adapter 5A/5B has a control information area 54A/54B for storing control information 53A/53B, and a host data area 55A/55B for storing host data from the host computer 2.

The shared memory 6 has: control information 63; an attribute information management table 60 and a data slot management table 61 for managing control information 73 for the cache memory 7; and a generation management information table 62 for managing the control information in the local memory 51A and 51B. Each table will be described later in detail.

The cache memory 7 stores the control information 73 and the host data 75 randomly within the sets for stored information allocated to the cache memory 7.

The control information according to this embodiment is normally stored in the hard disk drives 90 and also in the control information areas in the local memory 51A and 51B. Since the control information 53A and 53B stored in the local memory 51A and 51B will be reflected in the cache memory 7, this means that the cache memory 7 will also store the control information 73.

(2-2) Tables (2-2-1) Attribute Information Management Table

The attribute information management table 60 stored in the shared memory 6 will be described below.

The attribute information management table 60 is a table for managing information stored in the cache memory 7. As shown in FIG. 3, the attribute information management table 60 consists of a "data slot number" field 60A and an "attribute information" field 60B.

The "data slot number" field 60A stores the data slot number that is the minimum unit for managing the control information 73 and the host data 75 in the cache memory 7. The cache memory 7 has a plurality of data slots to store the control information 73 and the host data 75.

The "attribute information" field 60B stores information indicating whether the information stored in a certain data slot in the cache memory 7 is control information 73 or the host data 75.

(2-2-2) Data Slot Management Table

Next, the data slot management table 61 stored in the shared memory 6 will be described.

The data slot management table 61 is, like the attribute information management table 60, a table for managing the control information 73 and the host data 75 stored in the cache memory 7.

As shown in FIG. 4, the data slot management table 61 consists of an "attribute information" field 61A, a "data slot quantity" field 61B, and a "maximum data slot quantity" field 61C.

The "attribute information" field 61A is similar to the "attribute information" field 60B described above, so its description has been omitted.

The "data slot quantity" field 61B stores the number of sets of information stored in the relevant data slots in the cache memory 7 for each information attribute. For example, FIG. 4 shows that the number of sets of control information 73 stored in the cache memory 7 is "2."

The "maximum data slot quantity" field 61C stores the maximum number of sets of information that can be stored in the data slots of the cache memory 7 for each information attribute. For example, FIG. 4 shows that the maximum number of sets of control information 73 that can be stored in the cache memory 7 is "500."

(2-2-3) Generation Management Information Table

The control information 53A/53B stored in each local memory 51A/51B is updated individually in its local memory 51A/51B. Accordingly, even if the control information 53A in one local memory 51A is updated, the control information 53B in the other local memory 51B may not be updated and the update may not be smoothly reflected in the cache memory 7. In order to avoid this happening, generation management information is stored in the local memory 51A and 51B and the shared memory 6.

The generation management information is information for managing the update history of certain control information in terms of generations. As shown in FIG. 2, the generation management information is managed by using the generation management information tables 52A, 52B, and 62 stored in the local memory 51A and 51B and the shared memory 6.

The generation management information tables 52A, 52B, and 62 are tables for managing the generation management information. In this embodiment, the generation management information table 52A stored in the local memory 51A will be explained, but the generation management information tables 52B and 62 stored in the local memory 51B and the shared memory 6 have the same structure.

As shown in FIG. 5, the generation management information table 52A consists of a "page number" field 52X, a "generation number" field 52Y, and an "update date and time" field 52Z.

The "page number" field 52X stores a location number for the control information 53A stored in the local memory 51A. Here, the "page" means a minimum unit for the control information stored in the local memory.

The "generation number" field 52Y stores an update history number for the control information corresponding to the page number. The number of times the generation number stored in the "generation number" field 52Y has been incremented indicates the number of times the control information has been updated.

The "update date and time" field 52Z stores the latest update date and time for the control information corresponding to the page number.

The generation number and the update date and time corresponding to the page number constitute generation management information 520.

(2-3) Reference to Control Information

Since the various tables are structured as described above, if the configuration of the storage apparatus 4 in the storage system 1 is changed, the channel adapter 5A may refer to the control information 73 stored in the cache memory 7 and recognize the latest control information. Specific procedures executed by the channel adapter 5A for referring to the control information 73 stored in the cache memory 7 will be described below.

Figure 6:
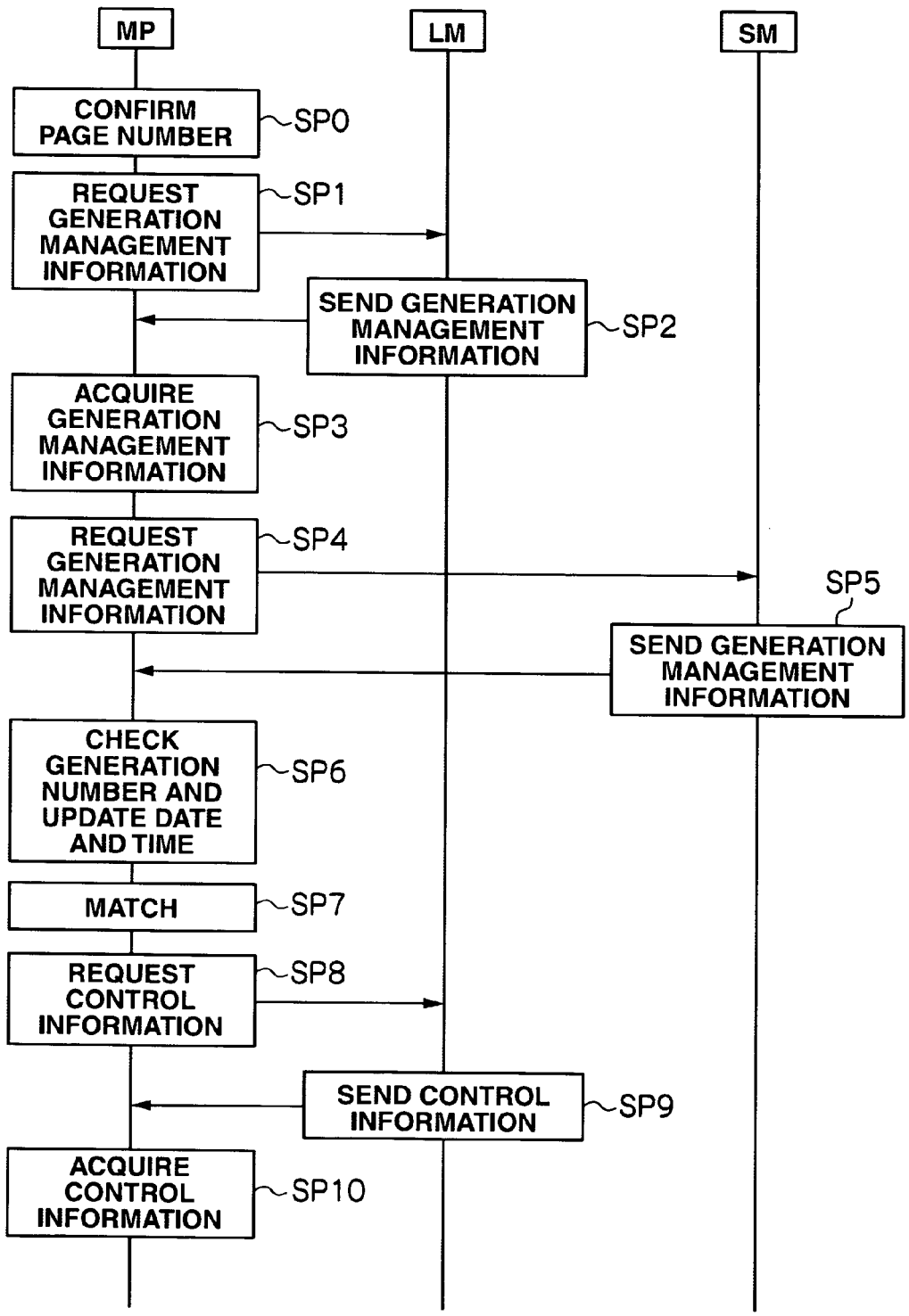
FIG. 6 shows a processing sequence for referring to control information according to the embodiment.

As shown in FIG. 6, the microprocessor 50A first confirms the page number of the control information 53A to be referred to (SP0). The microprocessor 50A then requests the generation number and the update date and time (hereinafter referred to as the "generation management information") 520 corresponding to the relevant page number from the local memory 51A (SP1).

Having received this request, the local memory 51A sends the generation management information 520 corresponding to the page number from the generation management information table 52A to the microprocessor 50A (SP2).

After the microprocessor 50A acquires the generation management information 520 (SP3), it also requests the generation management information (not shown in the drawing) corresponding to the page number from the shared memory 6 (SP4).

Having received this request, the shared memory 6 sends the generation management information corresponding to the page number from the generation management information table 62 to the microprocessor 50A (SP5).

Then, the microprocessor 50A compares the generation management information 520 received from the local memory 51A with the generation management information received from the shared memory 6 and checks the generation numbers and the update dates and times of both lots of generation management information (SP6).

If the microprocessor 50A determines that the generation management information 520 received from the local memory 51A matches the generation management information received from the shared memory 6 (SP7), this means that the control information 53A in the local memory 51A is the latest control information, and the microprocessor 50A requests acquisition of the control information 53A (without change) from the local memory 51A (SP8).

Having received this request, the local memory 51A sends the control information 53A to the microprocessor 50A (SP9).

The microprocessor 50A then acquires the control information 53A sent from the local memory 51A (SP10). Accordingly, the microprocessor 50A can refer to the control information 53A, which is the same control information as the latest control information 73 stored in the cache memory 7.

Figure 7:
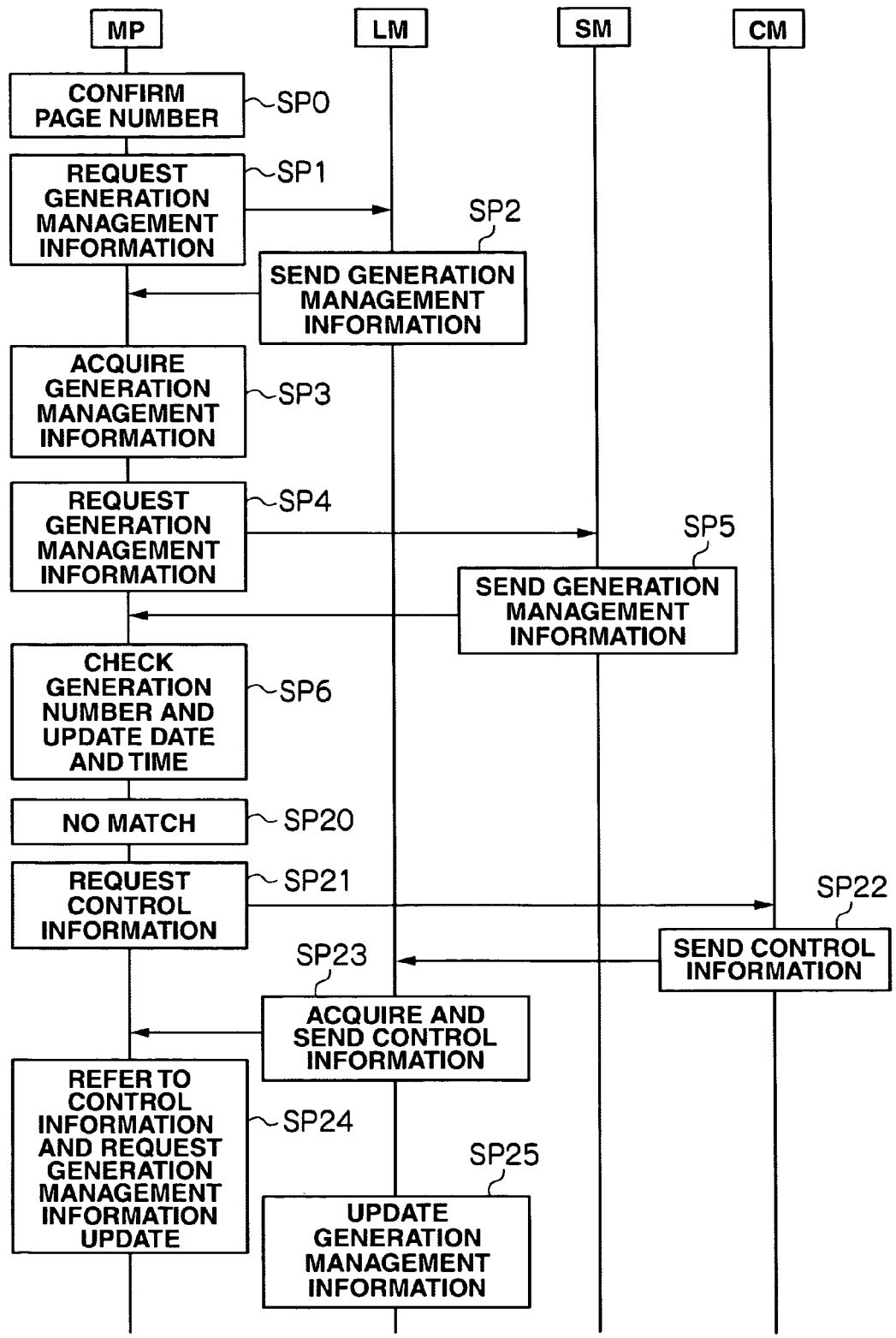
FIG. 7 shows a processing sequence for referring to the control information according to the embodiment.

On the other hand, as shown in FIG. 7, if the microprocessor 50A determines that the generation management information 520 received from the local memory 51A does not match the generation management information received from the shared memory 6 (SP20), this means that the control information 53A in the local memory 51A is not the most recent control information, and the microprocessor 50A requests acquisition of the control information 73 from the cache memory 7 (SP21).

Having received this request, the cache memory 7 first sends the control information 73 to the local memory 51A (SP22).

The local memory 51A, which has received the control information 73, then sends the control information 73 to the microprocessor 50A (SP23).

After the microprocessor 50A refers to the received control information 73, it makes a request to the local memory 51A to update the generation management information in the generation management information table 52A of the local memory 51A (SP24).

Having received this request, the local memory 51A updates any generation management information that does not match the generation management information received from the shared memory 6 (SP25). As a result, reference can be made to control information 53A which has become the same control information as the most recent control information 73 stored in the cache memory 7.

Incidentally, since the processing from step SP0 to step SP6 in FIG. 7 is the same as that from step SP0 to step SP6 in FIG. 6, its description has been omitted.

(2-4) Control Information Update

If new logical volume(s) VOL0 to VOLn are formed in the storage apparatus 4 of the storage system 1, a certain channel adapter 5A accesses the cache memory 7 so that it can update the control information 73 stored in the cache memory 7 and make the control information 53A in the channel adapter 5A reflected in the cache memory 7. Specific procedures executed by the channel adapter 5A for updating the control information 73 stored in the cache memory 7 will be described below.

Figure 8:
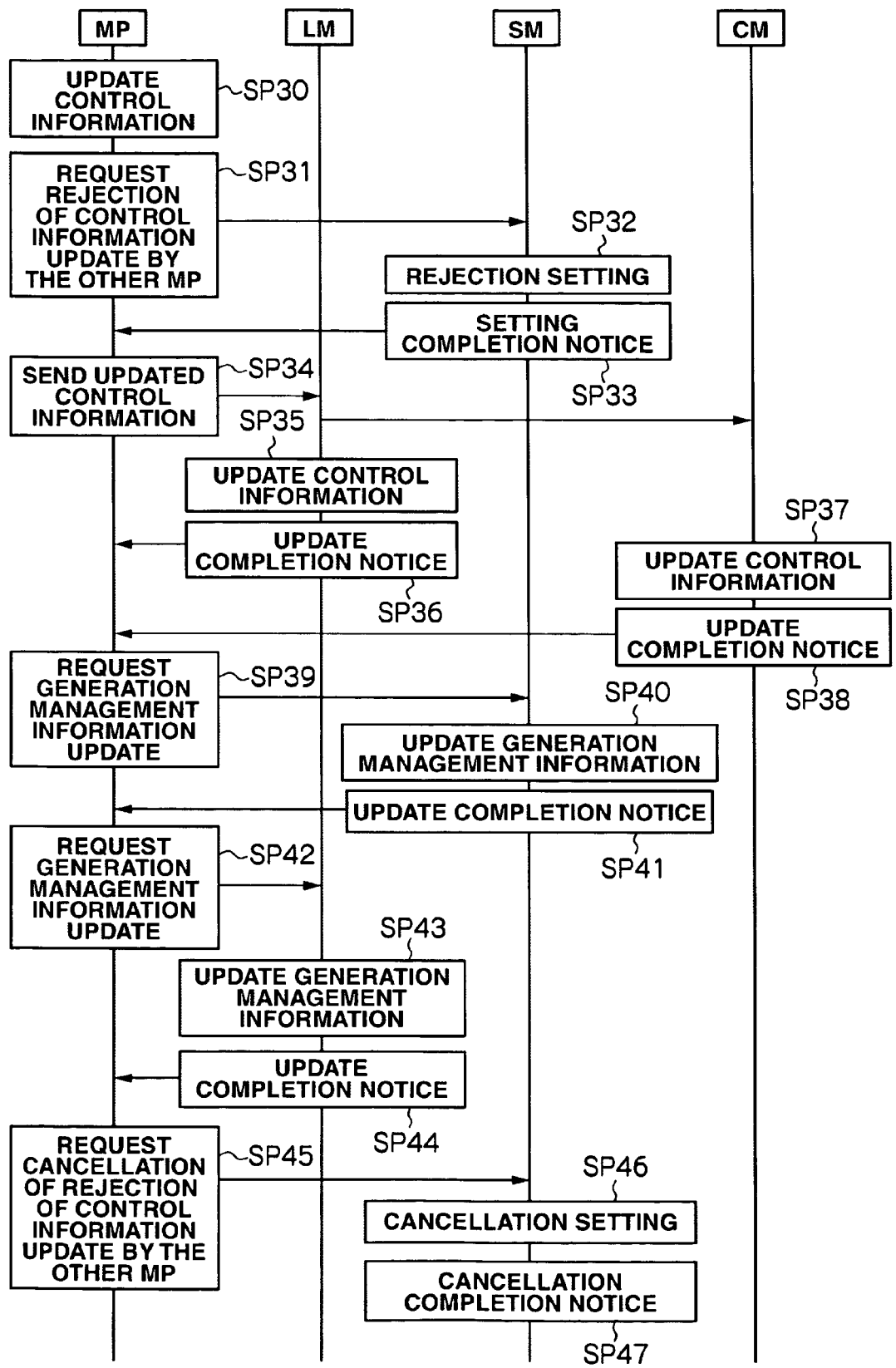
FIG. 8 shows a processing sequence for updating the control information according to the embodiment.

As shown in FIG. 8, the microprocessor 50A first updates the control information 53A in its own local memory 51A (SP30). Subsequently, the microprocessor 50A makes a request to the shared memory 6 to reject any update of the control information by the other microprocessor 50B (SP31).

Having received this request, the shared memory 6 configures rejection settings not to accept any update of the control information 63 by the other microprocessor 50B (SP32), and notifies the microprocessor 50A of the completion of the rejection settings (SP33).

The microprocessor 50A sends the updated control information 53A to the local memory 51A and the cache memory 7 (SP34).

After the local memory 51A and the cache memory 7 update their own control information 53A and 73 respectively (SP35 and SP37), the local memory 51A and the cache memory 7 notify the microprocessor 50A of the completion of the updates of the control information 53A and 73 (SP36 and SP38).

Then the microprocessor 50A makes a request to the shared memory 6 to update the generation management information in the generation management information table 62 (SP39).

After receiving this request, the shared memory 6 updates the generation management information corresponding to the page number for the updated control information (SP40), and then notifies the microprocessor 50A of the completion of the update (SP41).

Subsequently, the microprocessor 50A makes a request to the local memory 51A to update the generation management information 520 in the generation management information table 52A (SP42).

After receiving this request, the local memory 51A updates the generation management information 520 corresponding to the page number for the updated control information (SP43), and then notifies the microprocessor 50A of the completion of the update (SP44).

After the local memory 51A and the shared memory 6 finish updating the generation management information, the microprocessor 50A makes a request to the shared memory 6 to cancel the rejection of update of the control information by the other microprocessor 50B (SP45).

Having received this request, the shared memory 6 configures rejection cancellation settings to accept update of the control information by any microprocessor 50B (SP46), and notifies the microprocessor 50A of the completion of the rejection cancellation settings (SP47).

In the processing sequence described above, the channel adapter 5A can update the control information 73 stored in the cache memory 7.

(2-5) Reading Control Information

In order to refer to or update the control information as described above, the microprocessor 50A first reads the control information 53A stored in the local memory 51A and then performs the reference processing or the update processing. The procedures executed by the microprocessor 50A of the channel adapter 5A for reading the control information 53A from the local memory 51A will be described below.

Figure 9:
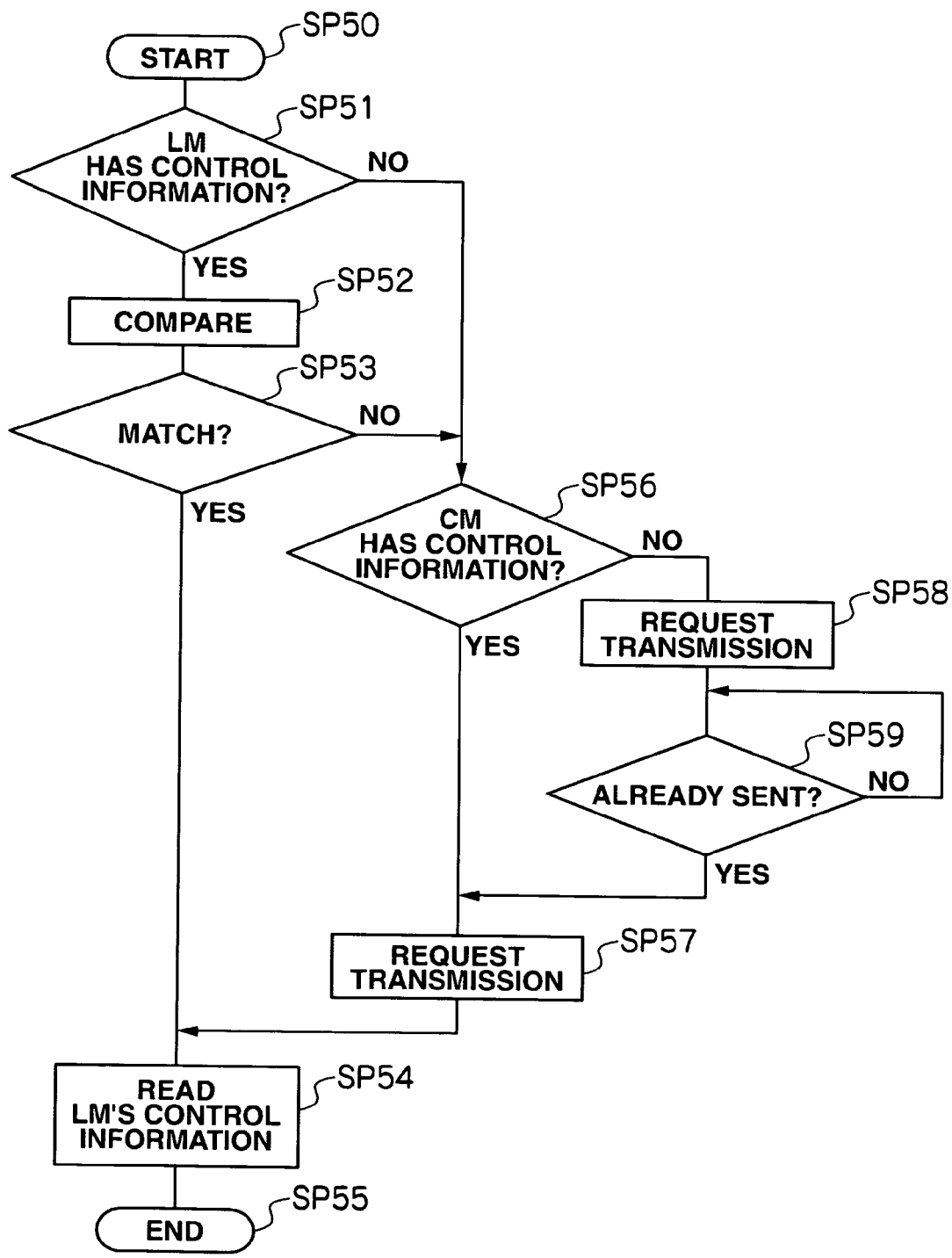
FIG. 9 is a flowchart illustrating a processing sequence for reading the control information according to the embodiment.

Specifically, as shown in FIG. 9, the microprocessor 50A starts processing for reading the control information in order to refer to or update the control information (SP50).

The microprocessor 50A then judges whether the control information 53A is stored in the local memory 51A or not (SP51).

Next, if the microprocessor 50A determines that the control information 53A is stored in the local memory 51A (SP51: YES), the microprocessor 50A reads the generation management information from the generation management information tables 52A and 62 in the local memory 51A and the shared memory 6 respectively and compares the generation management information 520 of the local memory 51A with the generation management information of the shared memory 6 (SP52).

The microprocessor 50A judges whether the generation management information 520 of the local memory 51A matches the generation management information in the shared memory 6 or not (SP53). If the microprocessor 50A determines that the generation management information 520 in the local memory 51A matches the generation management information in the shared memory 6 (SP53: YES), this means that the control information 53A of the local memory 51A is the most recent control information, and the microprocessor 50A reads the control information 53A in the local memory 51A directly (SP54) and terminates the control information reading processing (SP55).

If the microprocessor 50A determines in step SP51 that the control information 53A is not stored in the local memory 51A (SP51: NO), or if the microprocessor 50A determines in step SP53 that the generation management information 520 in the local memory 51A does not match the generation management information in the shared memory 6 (SP53: NO), the microprocessor 50A then judges whether the control information 73 is stored in the cache memory 7 or not (SP56).

If the microprocessor 50A determines that the control information 73 is stored in the cache memory 7 (SP56: YES), this means that the control information 73 is the most recent control information, and the microprocessor 50A requests transmission of the control information 73 from the cache memory 7 to the local memory 51A (SP57).

Subsequently, the microprocessor 50A treats the control information 73 in the cache memory 7 as the control information in the local memory 51A and performs the processing in step SP54, and terminates the control information reading processing (SP55).

If the microprocessor 50A determines that the control information 73 is not stored in the cache memory 7 (SP56: NO), it requests transmission of the control information 113 from the logical volumes VOL0 to VOLn, where the control information 113 is stored, to the cache memory 7 (SP58).

Then, the microprocessor 50A judges whether the control information 113 has been transmitted from the logical volumes VOL0 to VOLn, where the logical volume VOL0 to VOLn is stored, to the cache memory 7 or not (SP59). If the microprocessor 50A determines that the control information 113 has not been transmitted (SP59: NO), it repeats step SP59.

If the microprocessor 50A determines that the control information 113 has been transmitted from the logical volumes VOL0 to VOLn to the cache memory 7 (SP59:YES), the microprocessor 50A performs the processing in step SP57 and then the processing in step SP54 by treating the control information 113 as the control information in the local memory 51A, and finally terminates the control information reading processing (SP55).

The control information reading processing described above is performed in the storage apparatus 4, but part of the read control information may be sent to the host computer 2 and a user may configure the settings for or change the storage system 1 based on that part of the control information.

Since the microprocessor 50A performs the processing for reading the control information stored in each different place, it can read the control information with certainty.

(2-6) Configuration of Control Information Stored in Cache Memory

Next, the configuration of the control information 73 stored in the cache memory 7 will be described in detail.

Figure 10:
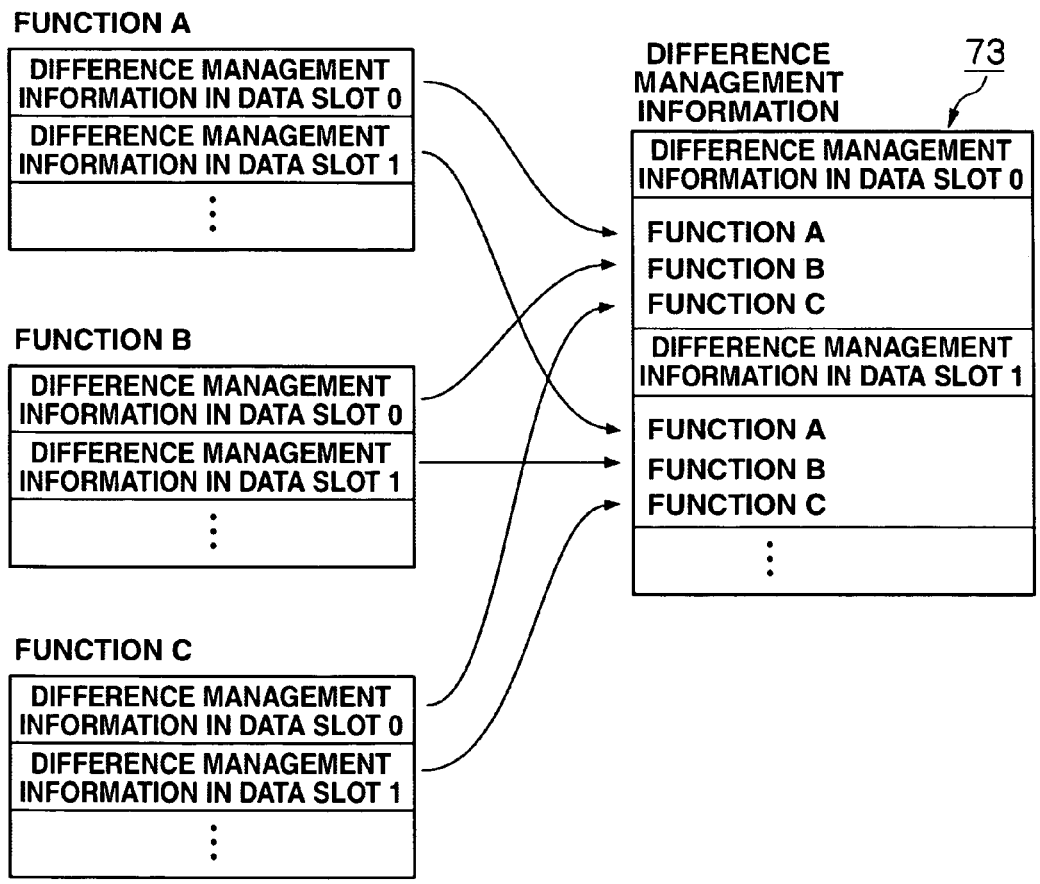
FIG. 10 is an example configuration diagram of the control information stored in cache memory according to the embodiment.

The cache memory 7 can transfer a block of data in several tens of bytes. The control information 73 according to this embodiment can also be transferred more efficiently as a block of data in several tens of bytes. So, as shown in FIG. 10, the configuration of the control information will be described below for the case where the control information is difference management information.

In conventional cases, the difference management information is stored for each function, for example, from function A to function C, and for each data block in the shared memory 6.

Incidentally, a "data slot" means a data block on a bit map. Various functions shown in FIG. 10 mainly indicate copy functions such as a remote copy function required to create duplicate data at a remote site and a shadow copy function of recording instantaneous data status at a certain point in time.

The control information 73 according to this embodiment is configured by gathering the difference management information for multiple functions for each same data slot number. This configuration enhances the search rate for searching for the control information 73 in the cache memory 7. Accordingly, when the microprocessors 50A and 50B search for the control information 73 in the cache memory 7 (processing of step SP56 in FIG. 9), they can search for and find the necessary control information with certainty.

(2-7) Configuration of Control Information Stored in Local Memory

Next, the configuration of the control information 53A and 53B stored in the local memory 51A and 51B will be described in detail below. Here, the case where the control information is the difference management information will be explained.

Figure 11:
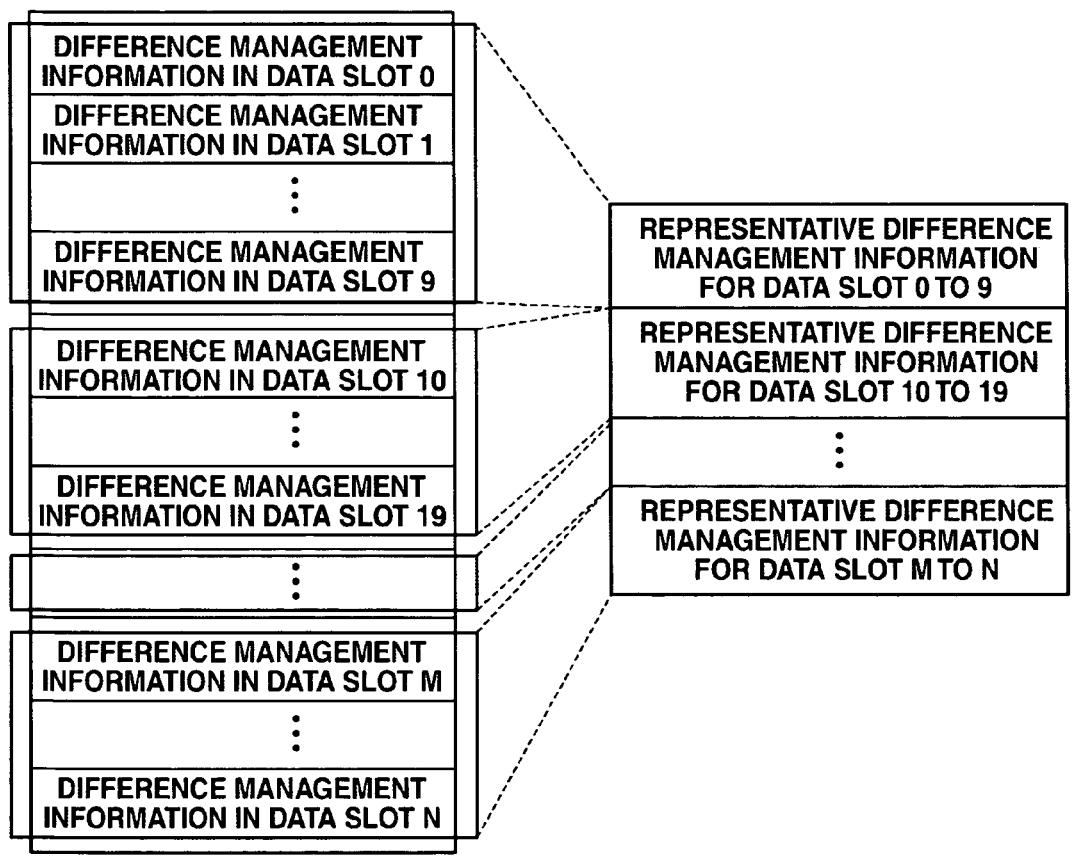
FIG. 11 is an example configuration diagram of the control information stored in cache memory and local memory according to the embodiment.

Although the capacity of the local memory 51A and 51B for storing information is small, the local memory 51A and 51B exhibits high access performance. So, as shown in FIG. 11, the difference management information is configured so that all the difference management information stored in the respective data slots in the cache memory 7 is not stored as it is, but the multiple data slots are grouped into one group and their representative difference management information is stored.

If a volume is to be copied, if there is a difference between the difference management information in data slots 0 to 9, this means that a difference is caused also in the representative difference management information. Accordingly, when copying the difference between a primary logical volume and a secondary logical volume, it is unnecessary to refer to the difference management information in each data slot, all that is necessary is to refer to this representative difference management information in order to perform the copy processing.

The control information stored in the local memory 51A and 51B is grouped control information obtained by grouping plural sets of control information, i.e., the representative control information for each group formed by gathering plural sets of control information into several groups.

This structure enhances the search rate for searching for the control information 53A and 53B in the local memory 51A and 51B. Accordingly, when the microprocessors 50A and 50B search for the control information 53A and 53B in the local memory 51A and 51B (processing of step SP51 in FIG. 9), they can search for and find the necessary control information with certainty.

(2-8) Configuration of Control Information Stored in Logical Volume

Next, the configuration of the control information 113 stored in logical volumes VOL0 to VOLn will be described below in detail.

Figure 12:
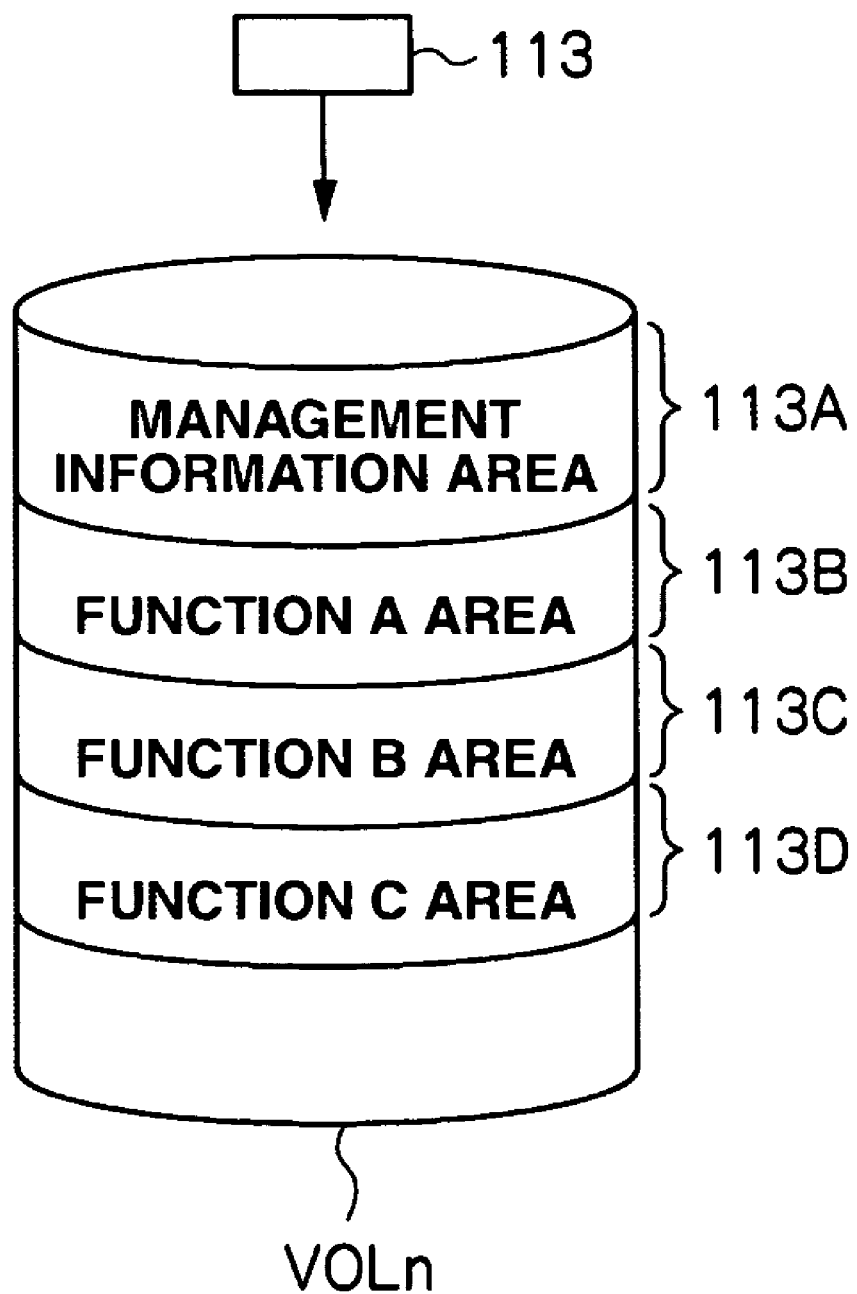
FIG. 12 is an example configuration diagram of the control information stored in a logical volume according to the embodiment.

As shown in FIG. 12, the control information 113 stored in the logical volume VOLn is composed of: management information for managing the control information 113 in a management information area 113A for managing the control information; and function information for each function in each function area 113B to 113D. The control information 113 may be stored in a special logical volume for storing the control information, or the management information area 113A and each function information area 113B to 113D in the logical volume may be secured and the control information 113 may be stored in these areas.

In order to secure the management information area 113A and each function information area 113B to 113D in the logical volume VOLn, there are, for example, two methods: one method is for a system administrator or similar to set and secure the respective areas 113A to 113D in advance when configuring the settings; and the other method is for the system administrator or similar to set and secure the respective areas 113A to 113D whenever necessary. In particular, in the case where the respective areas are secured when necessary, the system administrator or similar sets the function name, a top address, data size, and other necessary elements for the management information. In order to access this function information, the location of the function information area 113B to 113D needs to be confirmed according to the management information set by the system administrator or similar, and then the designated function information can be accessed.

Incidentally, functions A to C are indicated as the various control information functions for ease of explanation, but the number of control information functions increases or decreases depending on the type of control information.

(3) Control Information Storage Procedures According to this Embodiment

Next, how the control information 53A in the channel adapter 5A is stored in the storage system 1 will be described below.

(3-1) Procedures for Storing Difference Management Information

When the storage system 1 is in operation, there are two types of storage destinations for the control information 53A: the case where the entire control information 53A is stored in the logical volume VOLn; and the case where the control information 53A is stored in the shared memory 6 or the logical volume VOLn when the storage system 1 is extended.

Here, the procedures for acquiring the control information 53A stored in the channel adapter 5A and then storing it in the shared memory 6 or the logical volume VOLn will be described for the case where the control information 53A is difference management information.

As an example of extension of the storage system 1, the case where the microprocessor 50A selects, and creates a pair of, a primary logical volume and a secondary logical volume from a plurality of logical volumes VOL0 to VOLn will be explained.

Figure 13:
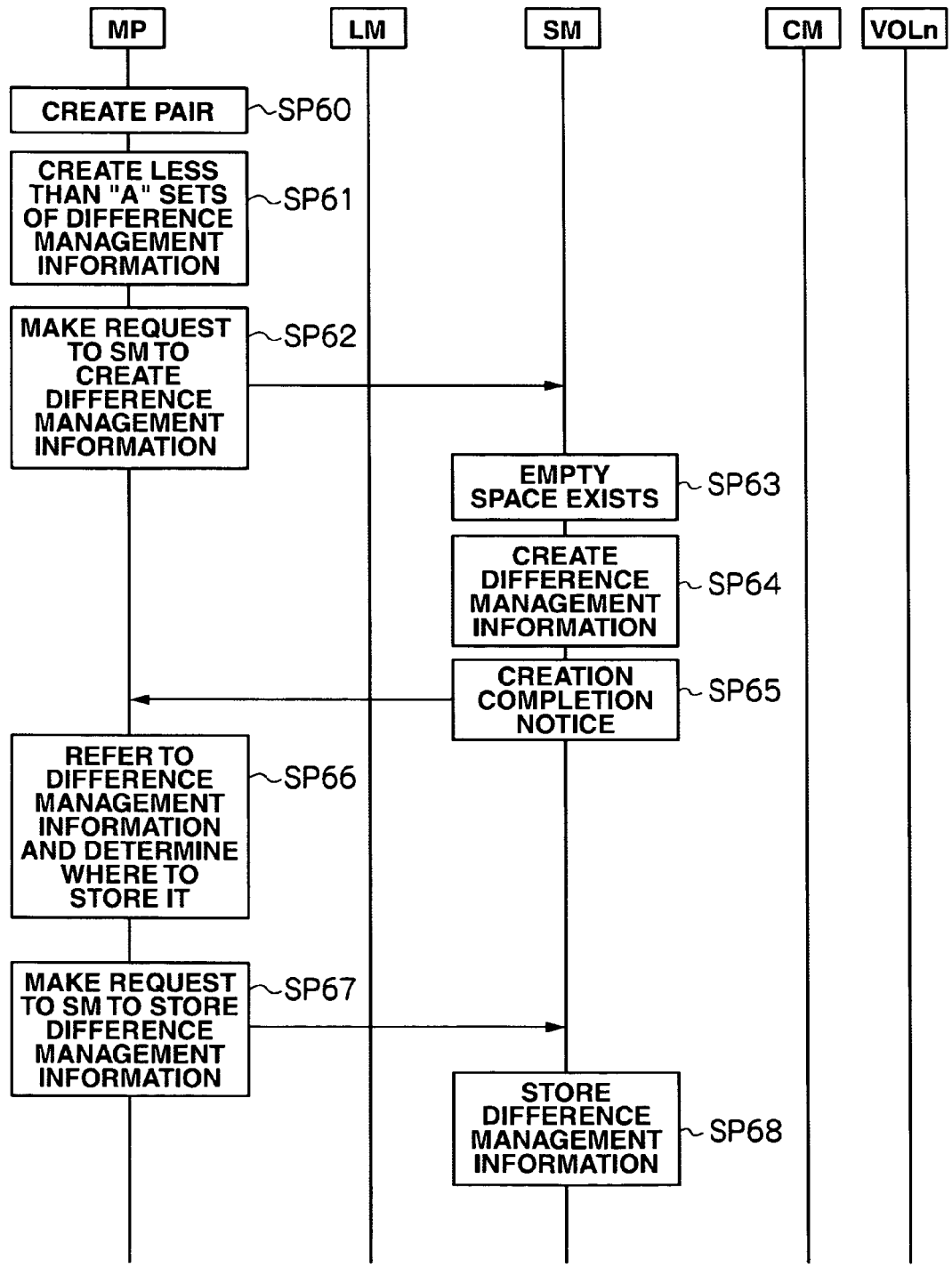
FIG. 13 shows a storage processing sequence where the control information according to the embodiment is difference management information.

Specifically as shown in FIG. 13, the microprocessor 50A first creates a pair of a primary logical volume and a secondary logical volume (SP60). The microprocessor 50A then creates less than "A" sets of difference management information (SP61).

Then the microprocessor 50A also makes a request to the shared memory 6 to create the difference management information (SP62).

Assuming that the number of sets of difference management information that can be stored in the shared memory 6 is "A," the shared memory 6, which has received the above request, judges whether enough empty space to store less than "A" sets of difference management information exists or not; and if the shared memory 6 determines that empty space exists (SP63), it creates the difference management information (SP64). Then, the shared memory 6 notifies the microprocessor 50A of the completion of creation of the difference management information (SP65).

Subsequently, the microprocessor 50A refers to the difference management information in the data slots for the paired logical volumes; and if the microprocessor 50A determines that there are less than "A" sets of difference management information (SP66), it makes a request to the shared memory 6 to store the relevant difference management information (SP67).

After receiving this request, the shared memory 6 stores less than "A" sets of difference management information (SP68).

Figure 14:
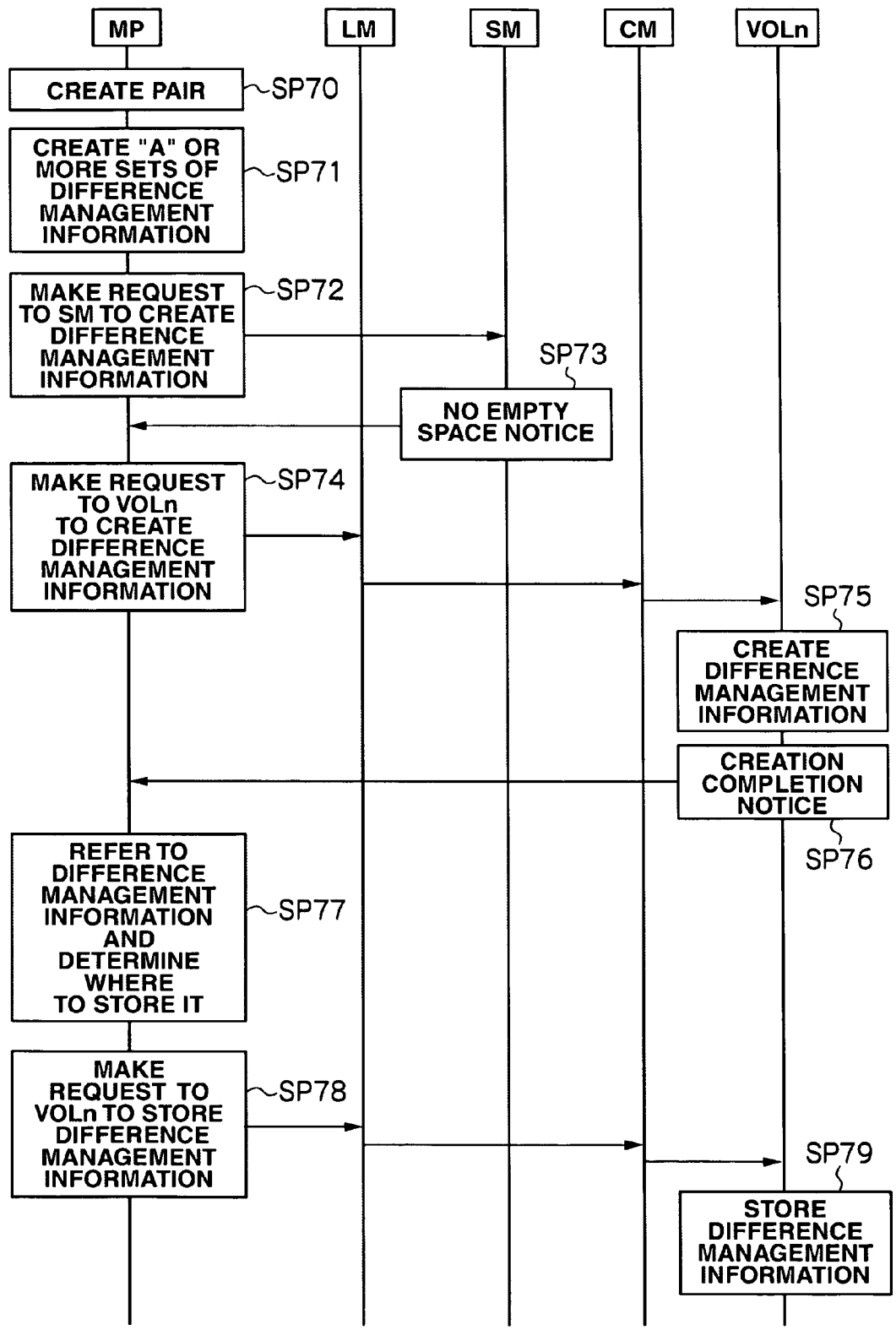
FIG. 14 shows a storage processing sequence where the control information according to the embodiment is difference management information.

In another case, as shown in FIG. 14, the microprocessor 50A creates a pair of a primary logical volume and a secondary logical volume (SP70), and creates "A" or more sets of difference management information (SP71).

Then the microprocessor 50A makes a request to the shared memory 6 to create the difference management information (SP72).

After receiving this request, the shared memory 6 judges whether enough empty space to store "A" or more sets of difference management information exists or not; and if the shared memory 6 determines that there is no empty space, it does not create the difference management information and notifies the microprocessor 50A of the fact that there is no empty space (SP73).

After receiving this notice, the microprocessor 50A makes a request to the logical volume VOLn to create the difference management information (SP74).

Having received this request via the local memory 51A and the cache memory 7, the logical volume VOLn creates the difference management information (SP75). The logical volume VOLn then notifies the microprocessor 50A of the completion of creation of the difference management information (SP76).

Subsequently, the microprocessor 50A refers to the difference management information in the data slots for the paired logical volumes; and if the microprocessor 50A determines that there are "A" or more sets of difference management information (SP77), it makes a request to the logical volume VOLn to store the relevant difference management information (SP78).

Having received this request via the local memory 51A and the cache memory 7, the logical volume VOLn stores "A" or more sets of difference management information (SP79).

Next, the case where the storage procedures shown in FIGS. 13 and 14 are executed based on judgment by the microprocessor 50A will be described below with reference to the relevant flowchart.

Figure 15:
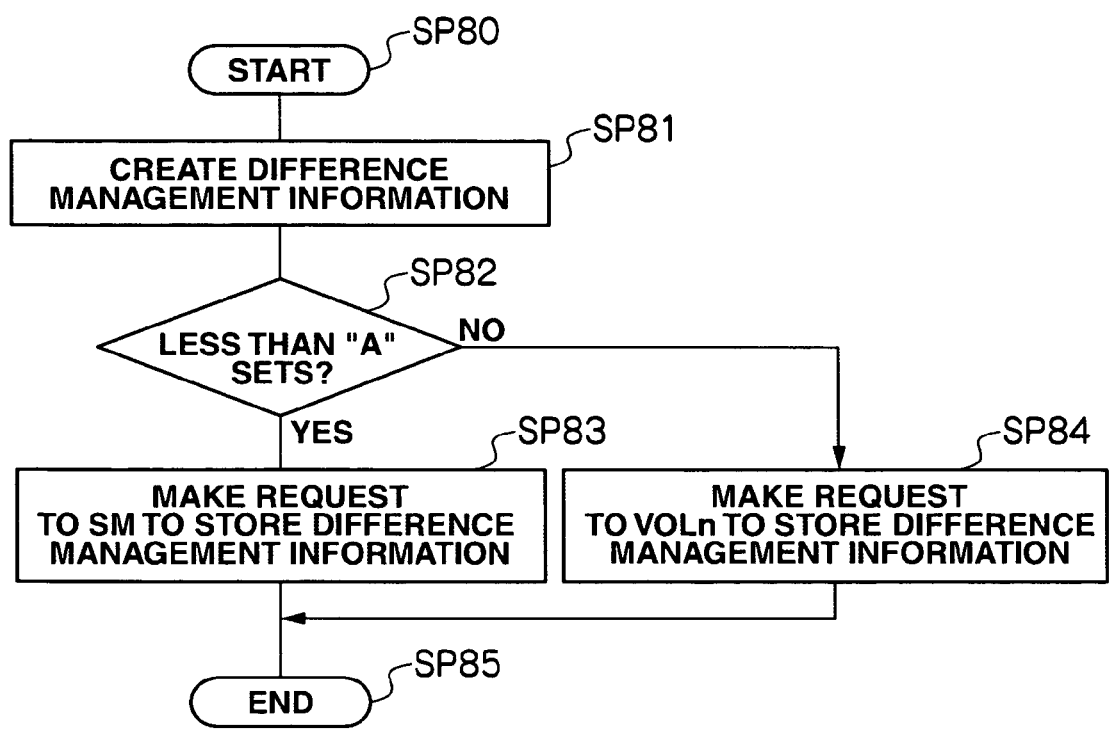
FIG. 15 is a flowchart illustrating a storage processing sequence where the control information according to the embodiment is difference management information.

As shown in FIG. 15, the processing starts when the microprocessor 50A selects, and creates a pair of, a primary logical volume and a secondary logical volume from a plurality of logical volumes VOL0 to VOLn (SP80).

The microprocessor 50A then creates the difference management information (SP81), and judges whether the number of sets of difference management information is less than "A" or not and where to store them (SP82).

If the microprocessor 50A determines that the number of created sets of difference management information is less than "A" sets (SP82: YES), the microprocessor 50A makes a request to the shared memory 6 to store them (SP83) and terminates this processing (SP85).

On the other hand, If the microprocessor 50A determines that the number of created sets of difference management information is "A" or more sets (SP82: NO), the microprocessor 50A makes a request to the logical volume VOLn to store them (SP84) and terminates this processing (SP85).

Incidentally, the processing steps executed by the microprocessor 50A correspond to the processing steps shown in FIG. 13 and FIG. 14. Specifically speaking, step SP80 corresponds to step SP60, step SP81 corresponds to steps SP61 and SP71, step SP82 corresponds to steps SP66 and SP77, step SP83 corresponds to step SP67, and step SP84 corresponds to step SP78.

In the storage system 1 according to this embodiment described above, it is possible to also select the logical volume VOLn to store the control information stored in the shared memory 6. Accordingly, it is possible to avoid compression of the capacity of the shared memory 6. Also, since the control information can be stored in the logical volume VOLn, even if the relevant control information should fail in the logical volume VOLn, the control information can be recovered. Therefore, fault tolerance of the storage system 1 can be enhanced.

(3-2) Procedures for Storing Log Information

When the storage system 1 is in operation, another possible storage destination for the control information 53A, besides the shared memory 6 described above, is the hard disk drive 100 of the service processor 10, that can store the control information that exceeds the capacity of the shared memory 6 and thereby cannot be stored in the shared memory 6.

Here, the procedures for storing the control information 53A that exceeds the capacity of the shared memory 6 and cannot be stored in the shared memory 6, by acquiring the control information 53A from the channel adapter 5A and storing it in the logical volume VOLn or the hard disk drive 100 of the service processor 10 will be described below for the case where the control information 53A is log information. Incidentally, the same storage procedures will apply if the control information 53A is monitor information.

Figure 16:
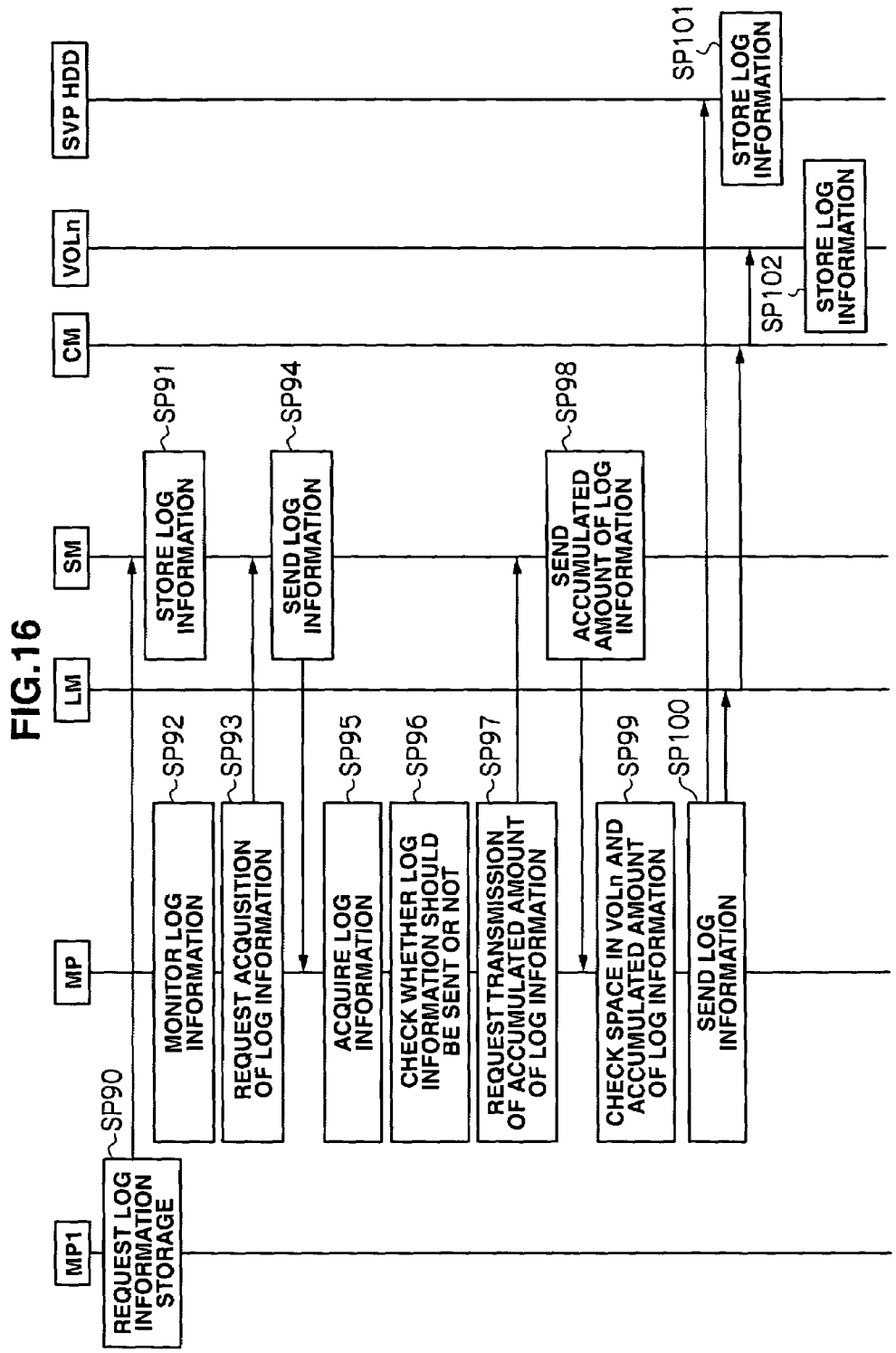
FIG. 16 shows a storage processing sequence where the control information according to the embodiment is log information.

As shown in FIG. 16, the microprocessor 50B makes a request to the shared memory 6 to store the log information (SP90).

After receiving this request, the shared memory 6 stores the log information recorded in the channel adapter 5B (SP91).

Meanwhile, the microprocessors 50A and 50B monitor the log information either asynchronously or synchronously (SP92) and requests acquisition of the log information from the shared memory 6 (SP93).

After receiving the request from the microprocessor 50A, the shared memory 6 sends the most recent log information to the microprocessor 50A (SP94).

The microprocessor 50A receives the log information from the shared memory 6, thereby acquiring the most recent log information (SP95).

Then the microprocessor 50A checks whether or not the log information in the microprocessor 50A should be sent to the hard disk drive 100 of the service processor 10 or to the logical volume VOLn (SP96). At the same time, the microprocessor 50A requests transmission of the accumulated amount of log information, which shows how much log information is stored, from the shared memory 6 (SP97).

After receiving this request, the shared memory 6 sends the accumulated amount of log information to the microprocessor 50A (SP98).

The microprocessor 50A checks whether there is space in the logical volume VOLn for storing the log information in the microprocessor 50A, and how much log information is accumulated in the shared memory 6 (SP99).

Based on the check results, the microprocessor 50A sends the log information to the hard disk drive 100 of the service processor 10 or the logical volume VOLn (SP100).

If there is no space for storing the log information in the logical volume VOLn, and if the accumulated amount of log information in the shared memory 6 is small, the hard disk drive 100 of the service processor 10 receives and stores the log information from the microprocessor 50A (SP101).

On the other hand, if there is space for storing the log information in the logical volume VOLn, and if the accumulated amount of log information in the shared memory 6 is large, the logical volume VOLn receives and stores the log information from the microprocessor 50A (SP102).

Figure 17:
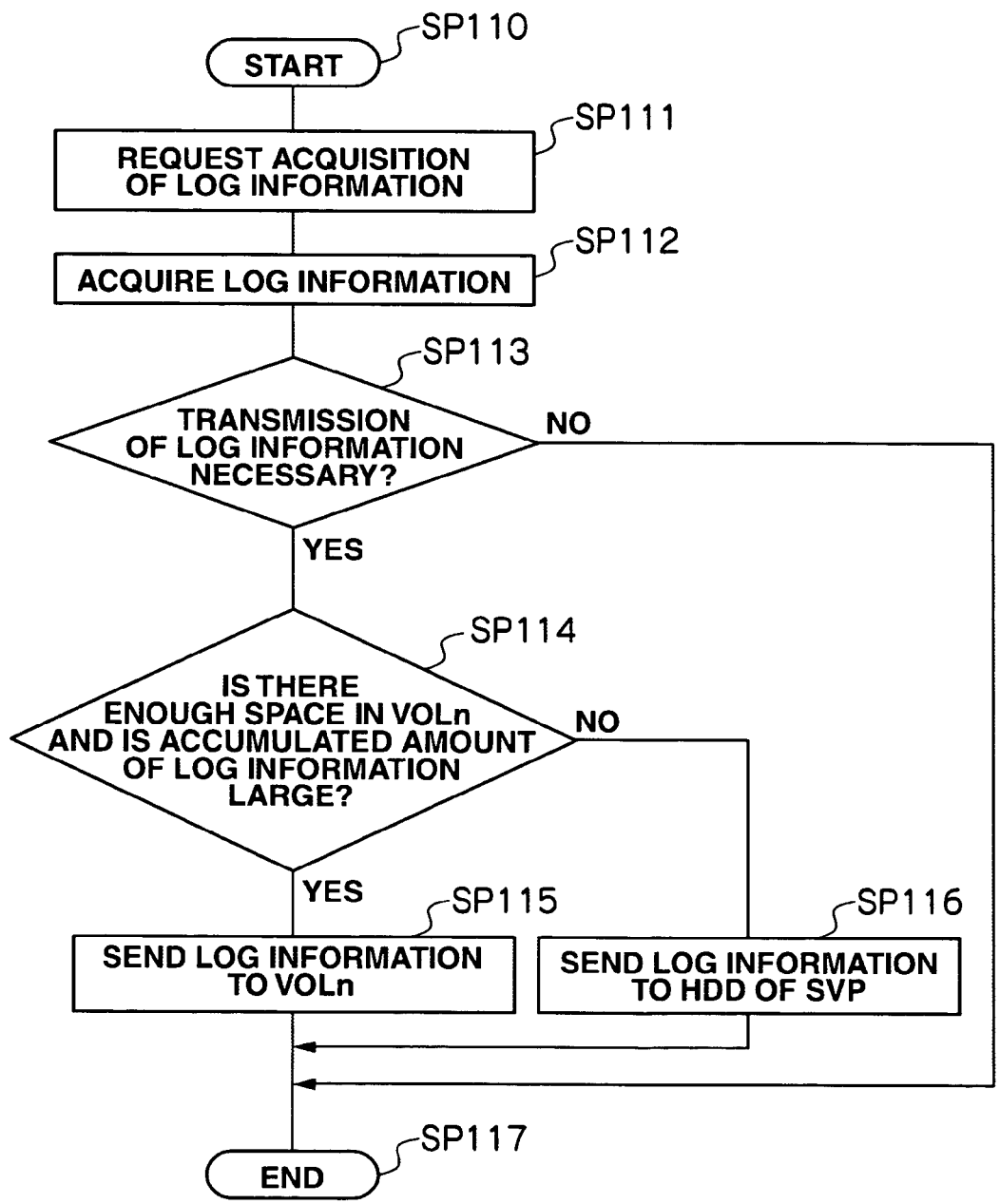
FIG. 17 is a flowchart illustrating a storage processing sequence where the control information according to the embodiment is log information.

Next, the case where the storage procedures shown in FIG. 17 are executed based on judgment by the microprocessor 50A will be described below with reference to the relevant flowchart.

As shown in FIG. 17, the processing starts when the microprocessor 50A starts continuously monitoring the log information (SP110).

The microprocessor 50A requests acquisition of the log information from the shared memory 6 (SP111) and then acquires the most recent information from the shared memory 6 (SP112).

The microprocessor 50A then checks whether or not the log information in the microprocessor 50A should be sent to the hard disk drive 100 of the service processor 10 or to the logical volume VOLn (SP113).

If the microprocessor 50A determines that the log information in the microprocessor 50A should be sent to the hard disk drive 100 of the service processor 10 or to the logical volume VOLn (SP113: YES), the microprocessor 50A then judges whether there is space for storing the log information in the logical volume VOLn or not, and whether the accumulated amount of log information in the shared memory 6 is large or not (SP114).

If the microprocessor 50A determines that there is space for storing the log information in the logical volume VOLn, and that the accumulated amount of log information in the shared memory 6 is large (SP114: YES), the microprocessor 50A sends the log information to the logical volume VOLn (SP115) and terminates this processing (SP117).

On the other hand, if the microprocessor 50A determines that there is no space for storing the log information in the logical volume VOLn, and that the accumulated amount of log information in the shared memory 6 is small (SP114: NO), the microprocessor 50A sends the log information to the hard disk drive 100 of the service processor 10 (SP116) and terminates this processing (SP117).

If the microprocessor 50A determines in step SP113 that the log information should not be sent to the hard disk drive 100 of the service processor 10 or to the logical volume VOLn (SP113: NO), the microprocessor 50A terminates this processing (SP117).

Incidentally, the processing steps executed by the microprocessor 50A correspond to the processing steps shown in FIG. 16. Specifically speaking, steps SP110 to SP116 in FIG. 17 correspond to steps SP92, SP93, SP95, SP96, SP99, and SP100 in FIG. 16.

In the storage system 1 according to this embodiment described above, not all the control information that exceeds the capacity of the shared memory 6 and cannot be stored in the shared memory 6 needs to be stored in the hard disk drive 100 of the service processor 10. Accordingly, it is possible to avoid compression of the capacity of the hard disk drive 100 of the service processor 10. Also, since the control information can be stored in the logical volume VOLn, even if the relevant control information should fail in the logical volume VOLn, the control information can be recovered. Therefore, fault tolerance of the storage system 1 can be enhanced.

(3-3) Procedures for Storing Difference Management Information When Stopping Storage System Next, the procedures for acquiring the control information stored in the shared memory 6 and storing it in the logical volume VOLn when stopping the storage system will be described below.

Here, the procedures for acquiring the control information 53A from the shared memory 6 and storing it in the logical volume VOLn will be described for the case where the control information 53A is difference management information.

Figure 18:
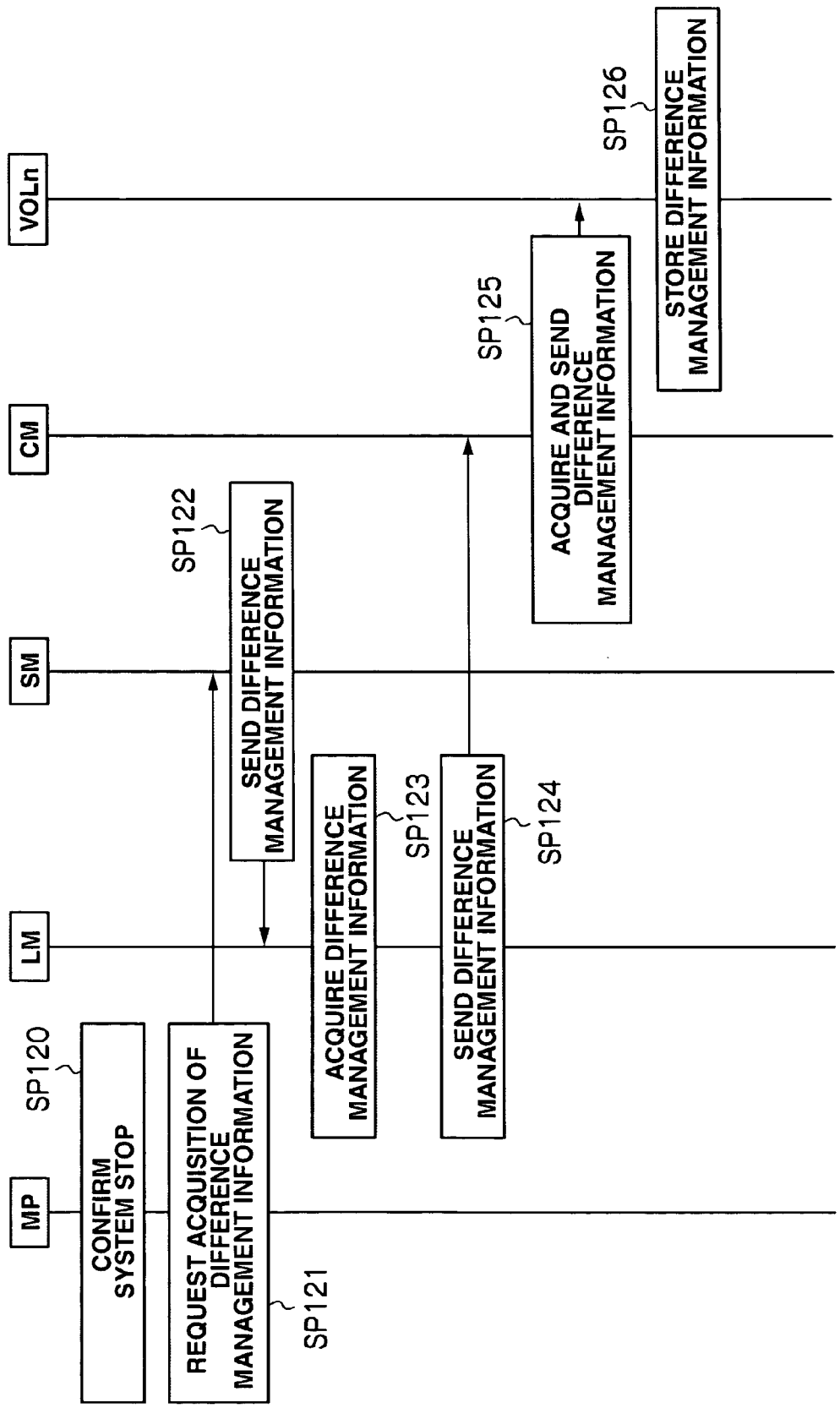
FIG. 18 shows a processing sequence for storing the control information according to the embodiment when stopping the storage system.

As shown in FIG. 18, the microprocessor 50A first confirms that the storage system 1 will be stopped (SP120), and then requests acquisition and transmission of the most recent difference management information from the shared memory 6 to the local memory 51A (SP121).

After receiving this request, the shared memory 6 sends the most recent difference management information to the local memory 51A (SP122).

After receiving the most recent difference management information (SP123), the local memory 51A sends the difference management information to the cache memory 7 in order to save the difference management information in the cache memory 7 temporarily (SP124). Here, the difference management information stored in the local memory 51A is the grouped control information obtained by grouping plural sets of difference management information as shown in FIG. 11.

After acquiring the most recent difference management information, the cache memory 7 sends the difference management information to the logical volume VOLn (SP125).

After receiving the most recent difference management information from the cache memory 7, the logical volume VOLn stores the difference management information in the secured area in the logical volume VOLn (SP126).

The logical volume VOLn in the storage system 1 can serve as a back-up for the volatile shared memory 6, when stopping the storage system 1 according to this embodiment described above, and the control information can be read from the shared memory 6 and stored in the logical volume VOLn.

(3-4) Procedures for Storing Difference Management Information When Activating Storage System Next, the procedures for acquiring the control information 113 stored in the logical volume VOLn and storing it in the shared memory 6 when activating the storage system will be described below.

Here, the procedures for acquiring the control information 113 stored in the logical volume VOLn and storing it in the shared memory 6 will be described for the case where the control information 53A is difference management information.

Figure 19:
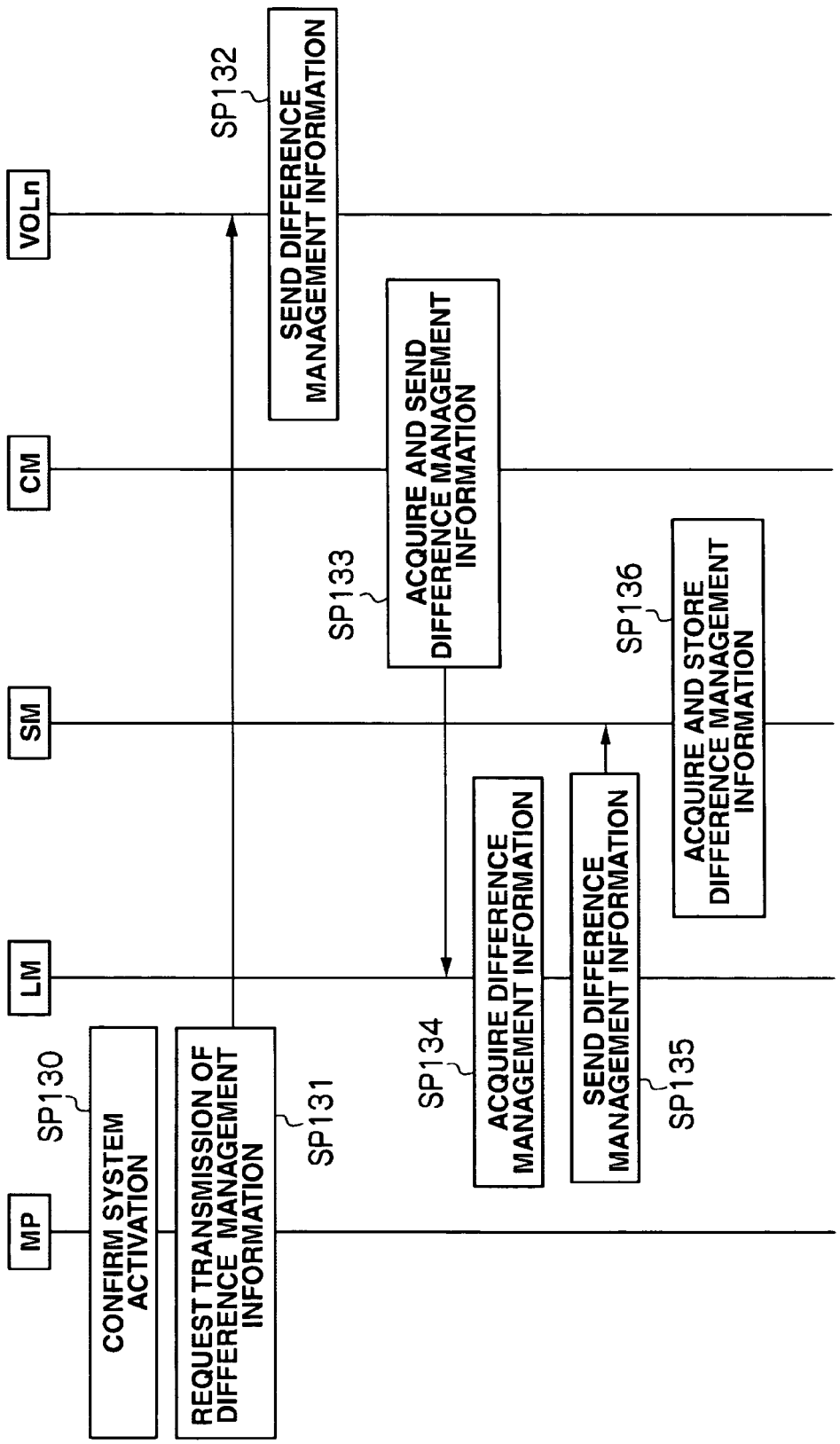
FIG. 19 shows a processing sequence for storing the control information according to the embodiment when activating the storage system.

As shown in FIG. 19, the microprocessor 50A first confirms that the storage system 1 will be activated (SP130), and the microprocessor 50A then requests transmission of the difference management information from the logical volume VOLn to the local memory 51A (SP131).

After receiving this request, the logical volume VOLn sends the difference management information to the cache memory 7 (SP132).

After receiving the difference management information from the logical volume VOLn, the cache memory 7 sends the difference management information to the local memory 51A (SP133).

When the local memory 51A acquires the difference management information from the cache memory 7 (SP134), the local memory 51A then sends the difference management information to the shared memory 6 (SP135). Here, the difference management information stored in the local memory 51A is management information for managing the difference management information shown in FIG. 11.

The shared memory 6 stores the difference management information after acquiring it from the local memory 51A (SP136).

When activating the storage system 1 according to this embodiment as described above, the logical volume VOLn in the storage system 1 can serve as a back-up for the volatile shared memory 6, and the control information can be read from the logical volume VOLn and then stored in the shared memory 6.

(3-5) Procedures for Storing Difference Management Information When Host Computer Makes Read/Write Request Next, the procedures for storing the control information in the local memory 51A or the shared memory 6 when the host computer 2 makes a read/write request will be described below. Here, the storage procedures will be described for the case where the control information is difference management information.

Figure 20:
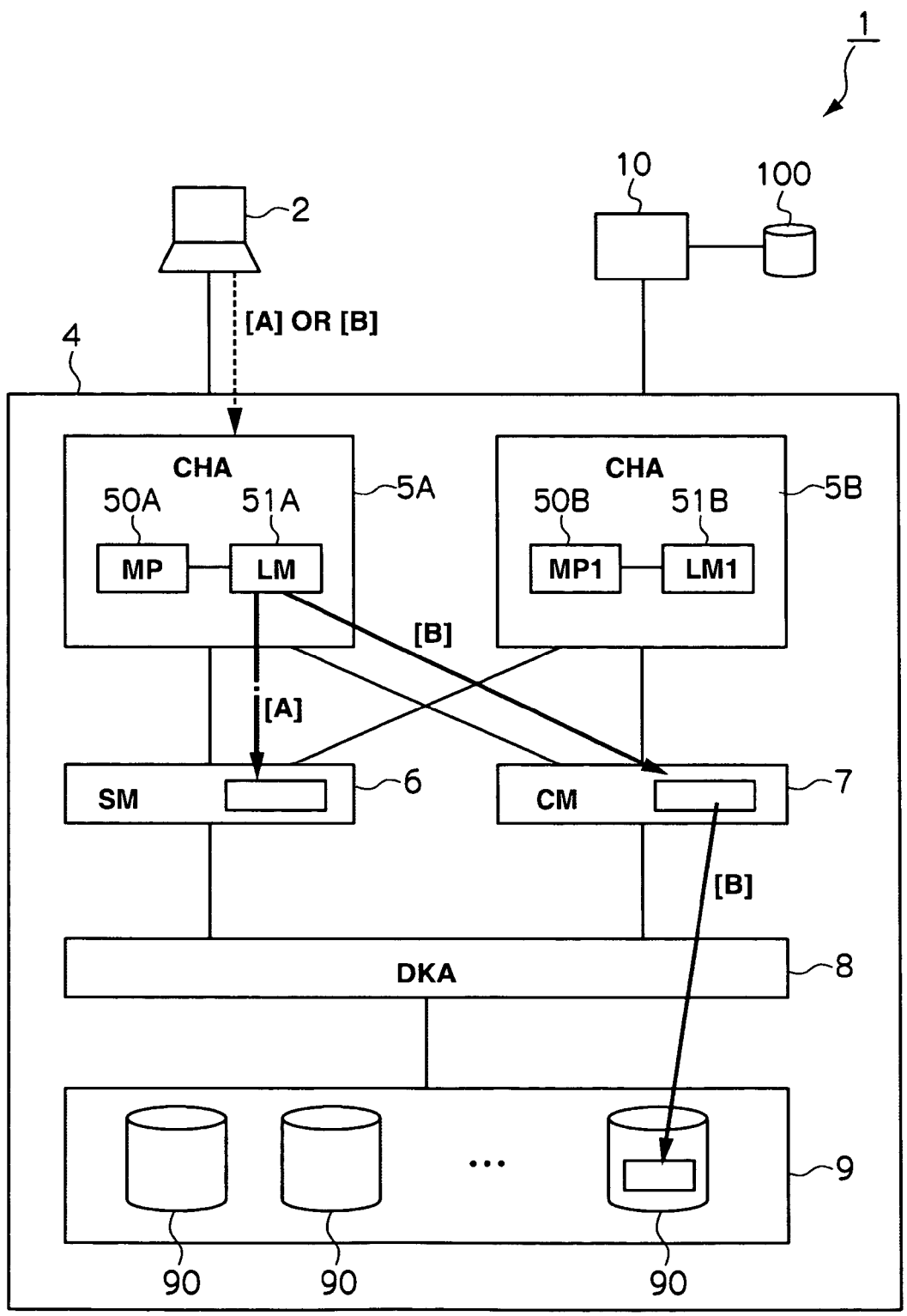
FIG. 20 is a block diagram showing the procedure to store the control information according to the embodiment when a write/read request is made by the host computer.

The dashed line in FIG. 20 indicates the flow of a write request from the host computer 2, and the dashed-dotted line and the solid lines in FIG. 20 indicate flows for the difference management information. FIG. 20 shows route [A] from the host computer 2 via the channel adapter 5A to the shared memory 6 for storing the control information in the shared memory 6, and route [B] from the host computer 2 via the local memory of the channel adapter 5A and the cache memory 7 to the logical volume VOLn for storing the control information in the logical volume VOLn.

Specific procedures for selecting those routes are as follows: after receiving a write request from the host computer 2, the channel adapter 5A judges whether the write target logical volume is paired with another logical volume or not.

If the channel adapter 5A determines that the logical volume VOLn, the write target, is paired with another logical volume, this means that there will be a difference between data slots for the primary logical volume and the secondary logical volume. Accordingly, it is necessary to update the difference management information.

If the difference management information to be updated is stored in the shared memory 6, the shared memory 6 updates the difference management information, the update target, as usual. When updating the difference management information in the shared memory 6, the difference management information flows through the control information area in the local memory 51A of the channel adapter 5A. This means that the control information area will be used, but the difference management information will not be stored there.

On the other hand, if the difference management information to be updated is stored in the logical volume VOLn, the difference management information is updated by the control information update procedures explained in FIG. 8 and the control information reading procedures explained in FIG. 9. When updating the difference management information in the logical volume VOLn, the difference management information stored in the control information area of the local memory 51A of the channel adapter 5A will also be updated. So the local memory 51A will be utilized as a buffer for temporarily storing the difference management information.

If the host computer 2 makes a read request, the difference management information will not be updated, so it is unnecessary to perform the procedures for storing the difference management information in that case.

In the storage system 1 according to this embodiment described above, the logical volume VOLn can serve as a back-up for the volatile shared memory 6 and the local memory 51A can serve as a back-up for the logical volume VOLn. Accordingly, there will be no speed difference in the access performance when accessing the control information in either the logical volume VOLn or the shared memory 6.

(3-6) Procedures for Referring to or Updating Difference Management Information When Host Computer Makes Read/Write Request Next, the procedures for referring to or updating the control information stored in the local memory 51A or the shared memory 6 when the host computer 2 makes a read/write request will be described below. Here, the storage procedures will be explained for the case where the control information is difference management information.

Figure 21:
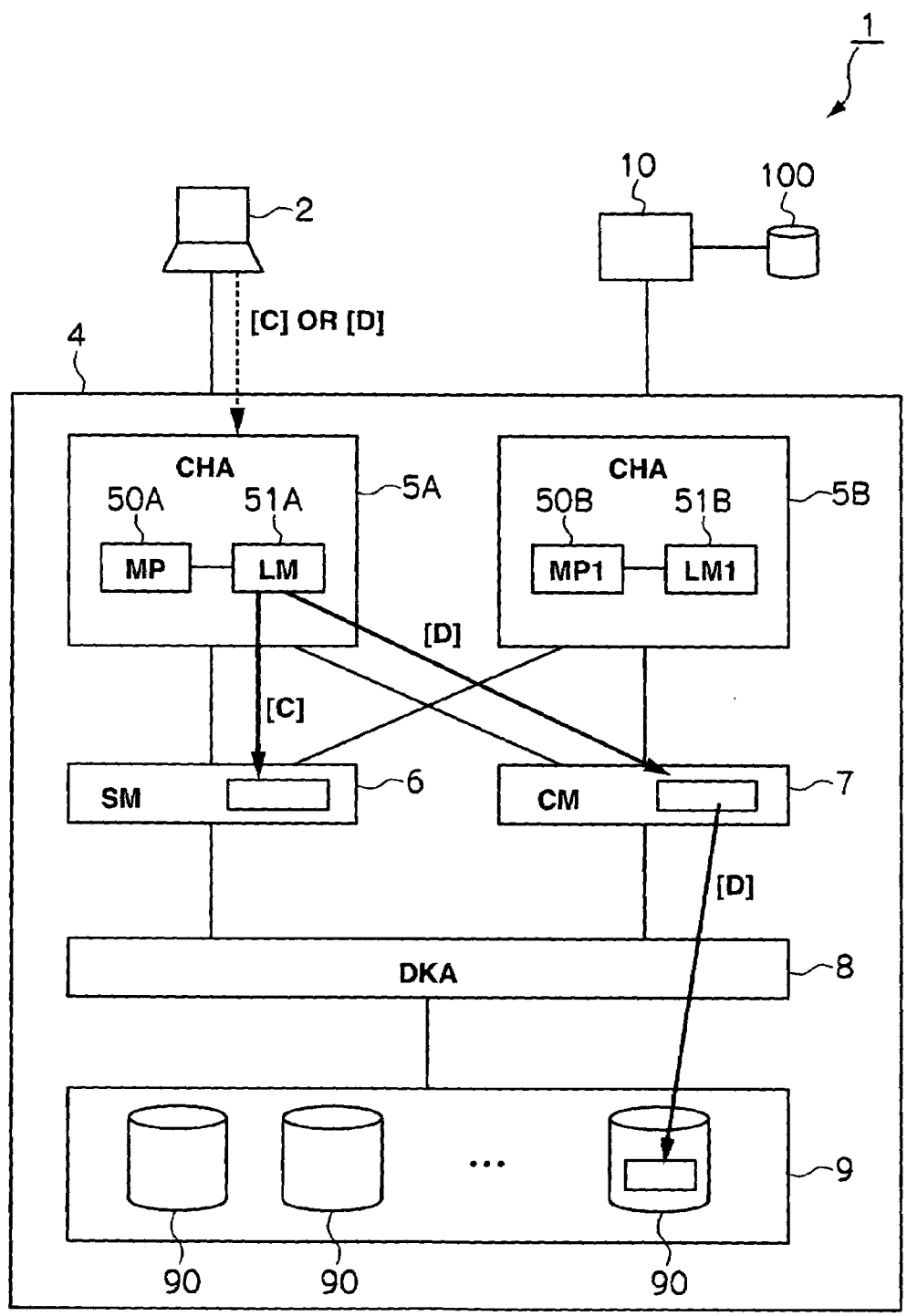
FIG. 21 is a block diagram showing the procedure to access the control information according to the embodiment when a write/read request is made by the host computer.

The dashed line in FIG. 21 indicates the flow of a write request from the host computer 2, and the solid lines in FIG. 21 indicate flows for the difference management information. FIG. 21 shows route [C] from the host computer 2 via the channel adapter 5A to the shared memory 6 for access and referral to, and update of the control information in the shared memory 6, and route [D] from the host computer 2 via the local memory 51A of the channel adapter 5A and the cache memory 7 to the logical volume VOLn for access and referral to, and update of the control information 113 in the logical volume VOLn.

Figure 22:
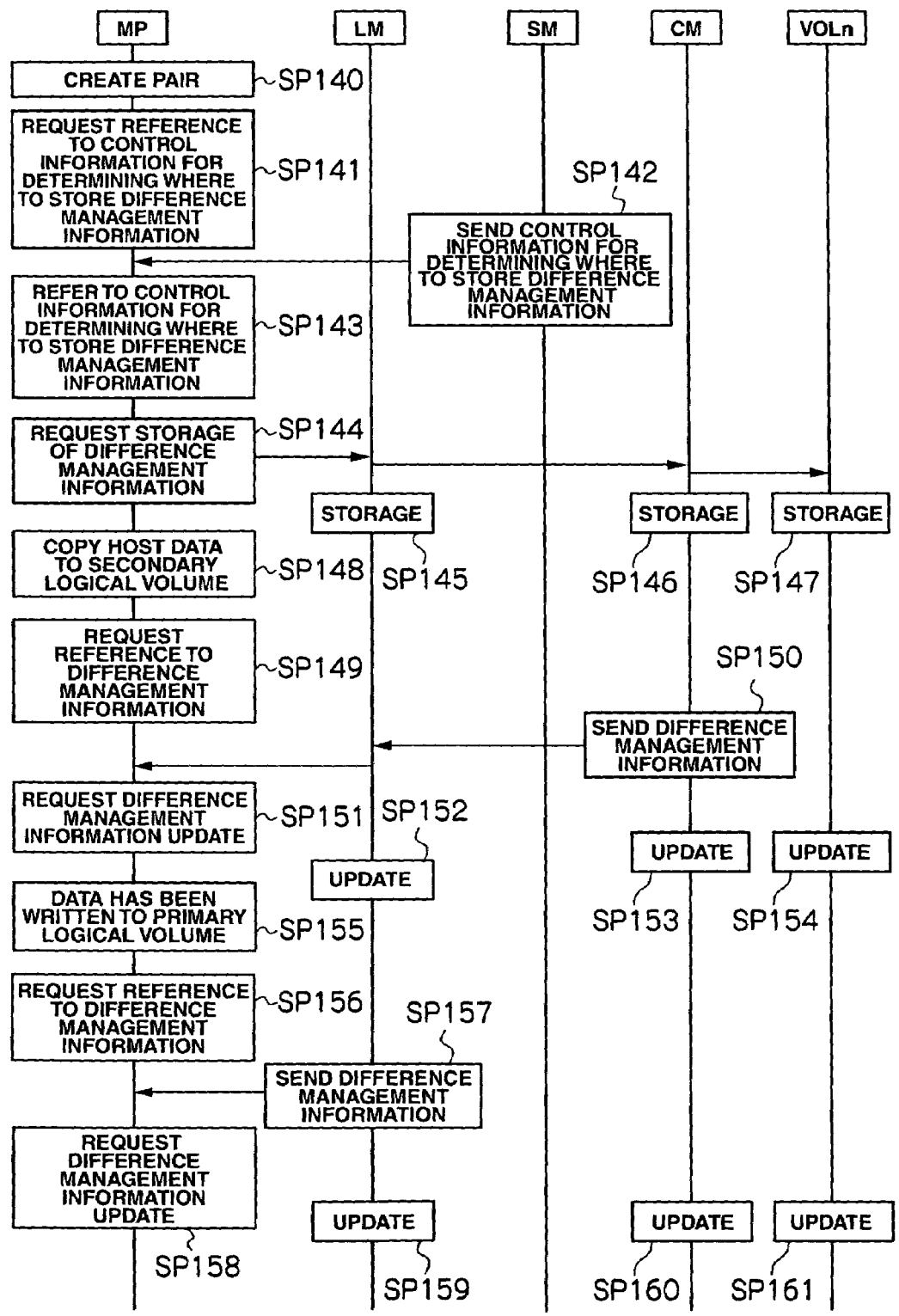
FIG. 22 shows a processing sequence for accessing the control information according to the embodiment when a write/read request is made by the host computer.

As shown in FIG. 22, the microprocessor 50A in the channel adapter 5A first creates the write target logical volume as a primary logical volume, and another logical volume as a secondary logical volume, and pair them with each other (SP140).

The microprocessor 50A then makes a request to the shared memory 6 to refer to the control information to judge where to store the difference management information (SP141). The shared memory 6 then sends the control information for judging where to store the difference management information, via the local memory 51A to the microprocessor 50A (SP142).

After receiving the control information for judging where to store the difference management information from the shared memory 6, the microprocessor 50A refers to the control information (SP143) and judges whether the difference management information should be stored in the shared memory 6 or the logical volume VOLn. In the example shown in FIG. 22, the microprocessor 50A determines that the difference management information should be stored in the logical volume VOLn.

Incidentally, the processing steps for judging the storage destination in steps SP141 to SP143 correspond to steps SP61 to SP66 in FIG. 13 or steps SP71 to SP77 in FIG. 14.

Subsequently, the microprocessor 50A makes a request to the logical volume VOLn to store the difference management information (SP144).

After the logical volume VOLn receives this request, the local memory 51A first stores the management information for managing the difference management information (SP145), and the cache memory 7 then stores the grouped information obtained by grouping the difference management information for each data slot (SP146).

The cache memory 7 sends the difference management information to the logical volume VOLn, and the logical volume VOLn stores it (SP147).

Next, the microprocessor 50A copies the host data in the primary logical volume to the secondary logical volume (SP148). The difference between the primary logical volume and the secondary logical volume will no longer exist when the host data is copied. Consequently, it becomes necessary to update the difference management information corresponding to the host data. So, the microprocessor 50A makes a request to refer to the difference management information stored in the cache memory 7 (SP149).

After receiving this request, the cache memory 7 sends the difference management information via the local memory 51A to the microprocessor 50A (SP150).

Upon receiving the difference management information, the microprocessor 50A requests the update of the difference management information according to the procedures explained in FIG. 8 (SP151).

After receiving this request, the local memory 51A, the cache memory 7, the logical volume VOLn update their own respective difference management information (SP152 to SP154).

Next, if the host computer 2 writes data to the primary logical volume (SP155), the microprocessor 50A makes a request to the local memory 51A to refer to the difference management information (SP156).

After receiving this request, the local memory 51A sends the difference management information to the microprocessor 50A (SP157).

Upon receiving the difference management information, the microprocessors 50A and 50B request the update of the difference management information either synchronously or asynchronously according to the procedures explained in FIG. 8 (SP158), and the processing in steps SP159 to SP161 are executed in the same manner as in steps SP152 to SP154 described above.

In the storage system 1 according to this embodiment described above, the logical volume VOLn can serve as a back-up for the volatile shared memory 6 and the local memory 51A can serve as a back-up for the logical volume VOLn. Accordingly, there will be no speed difference in the access performance when accessing the control information in either the logical volume VOLn or the shared memory 6.

(4) Advantageous Effects of the Invention

According to this embodiment, the control information 113 is stored in the inexpensive hard disk drives 90, which are operated according to RAID methodology, and the function of backing up the shared memory 6 can be fulfilled. As a result, even if the power for the storage system 1 is turned off, the control information 113 can be retained.

Furthermore, not only the control information 113 is stored in the hard disk drives 90 operated according to RAID methodology, but also the management information for the control information is stored in the local memory 51 of the channel adapter 5. Accordingly, the control information in the local memory 51 can be used as a buffer and higher access performance can be achieved than in the case where the control information is stored in the shared memory 6.

(5) Other Embodiments

In the storage system 1 having the host computer 2 for making data read/write requests, and the storage apparatus 4 for storing data from the host computer 2, the storage apparatus 4 includes: the channel adapter 5, which is a communication interface with the host computer 2; and the shared memory 6 connected to the channel adapter 5. The shared memory 6 includes the shared storage unit for storing the control information for controlling the storage apparatus 4. The channel adapter 5 includes: the local memory 51A for storing, as the control information 53A, either the control information that should be stored in the event the storage apparatus 4 stops, or the control information that exceeds the capacity of the shared memory 6 and cannot be stored in the shared memory 6; the first search unit (SP51) for searching for searching for necessary control information 53A in the one or more sets of control information 53A stored in the local memory 51A; and the microprocessor 50A for executing corresponding control processing based on the control information 53A found by the first search unit. However, the first search unit may be a separate hardware unit. In the embodiment described in the previous sections, the shared storage unit is the shared memory 6 and, therefore, not shown in the drawings. However, the shared storage unit may be a self-contained unit in the shared memory 6.

Also, the local memory 51A stores, as the generation management information table 52A, the first generation management information for managing updates of the control information 53A. The shared memory 6 stores, as the generation management information table 62, the second generation management information for managing updates of the control information that should be stored in the event the storage apparatus 4 stops, or the control information that exceeds the capacity of the shared memory 6 and cannot be stored in the shared memory 6. The microprocessor 50A includes the comparator (SP52 and SP53) for comparing the first generation management information 520 with the second generation management information based on the control information 53A found by the first search unit (SP51). If the comparator finds that the first generation management information 520 matches the second generation management information (SP53: YES), the found control information is sent as the first control information to the local memory 51A. However, the comparator may be a separate hardware unit.

Furthermore, the storage apparatus 4 has the cache memory 7 connected to the channel adapter 5. The cache memory 7 includes the second storage unit for storing, as the second control information 73, the control information that should be stored in the event the storage apparatus 4 stops, or the control information that exceeds the capacity of the shared memory 6 and cannot be stored in the shared memory 6. If the control information 53A cannot be found by the first search unit (SP51: NO), the second search unit included in the microprocessor 50A searches for the second control information 73 (SP56), and the microprocessor 50A then sends the second control information 73 found by the second search unit, as the first control information, to the local memory 51A. However, the second search unit may be a separate hardware unit.

Furthermore, if the comparator (SP52 and SP53) finds that the first generation management information 520 does not match the second generation management information (SP53: NO), the second search unit (SP56) searches for the second control information 73.

Since the second storage unit is the cache memory 7 in the embodiment described in the previous sections, the second storage unit is not shown in the drawings. However, the second storage unit may be a self-contained unit in the cache memory 7.

This invention can be widely applied to a storage system having one or more storage apparatuses, and to other types of storage systems.

What is claimed is:

1. A storage system comprising:
   a host system for making a data read/write request; and
   a storage controller for storing data from the host system;
   wherein the storage controller includes: a channel adapter that is a communication interface with the host system; and shared memory connected to the channel adapter;
   wherein the shared memory includes a shared storage unit for storing control information for controlling the storage controller; and
   wherein the channel adapter includes:
      a first storage unit for storing, as one or more sets of first control information, either the control information that should be stored in the event the storage controller stops, or the control information that exceeds the capacity of the shared storage unit and cannot be stored in the shared storage unit;
      a first search unit for searching for necessary first control information in the one or more sets of first control information stored in the first storage unit; and
      a processor for executing corresponding control processing based on the first control information found by the first search unit.

2. The storage system according to claim 1, wherein the first storage unit stores first generation management information for managing updates of the first control information,
   wherein the shared storage unit stores second generation management information for managing updates of either the control information that should be stored in the event the storage controller stops, or the control information that exceeds the capacity of the shared storage unit and cannot be stored in the shared storage unit, and
   wherein the processor includes a comparator for comparing the first generation management information with the second generation management information based on the first control information found by the first search unit; and if the comparator finds that the first generation management information matches the second generation management information, the processor sends the found control information as the first control information to the first storage unit.

3. The storage system according to claim 1, wherein the storage controller includes cache memory connected to the channel adapter,
   wherein the cache memory includes a second storage unit for storing, as second control information, either the control information that should be stored in the event the storage controller stops, or the control information that exceeds the capacity of the shared storage unit and cannot be stored in the shared storage unit, and
   wherein the processor includes a second search unit for searching for the second control information if the first control information cannot be found by the first search unit; and the processor sends, as the first control information, the second control information found by the second search unit to the first storage unit.

4. The storage system according to claim 1, wherein the first control information is grouped control information obtained by grouping plural sets of control information that should be stored in the event the storage controller stops, or plural sets of control information that exceed the capacity of the shared storage unit and cannot be stored in the shared storage unit.

5. The storage system according to claim 2, wherein if the comparator finds that the first generation management information does not match the second generation management information, the second search unit searches for the second control information.

6. A method for controlling a storage system including a host system for making a data read/write request, and a storage controller for storing data from the host system,
   the storage controller including a channel adapter that is a communication interface with the host system, and shared memory connected to the channel adapter,
   the shared memory including a shared storage unit for storing control information for controlling the storage controller,
   the channel adapter including a first storage unit for storing, as one or more sets of first control information, either the control information that should be stored in the event the storage controller stops, or the control information that exceeds the capacity of the shared storage unit and cannot be stored in the shared storage unit, and
   the storage system control method comprising:
      a first search step of searching for necessary first control information in the one or more sets of first control information stored in the first storage unit; and an execution step of executing corresponding control processing based on the first control information found in the first search step.

7. The storage system control method according to claim 6, wherein the first storage unit stores first generation management information for managing updates of the first control information,
wherein the shared storage unit stores second generation management information for managing updates of either the control information that should be stored in the event the storage controller stops, or the control information that exceeds the capacity of the shared storage unit and cannot be stored in the shared storage unit, and
wherein the execution step includes a comparison step of comparing the first generation management information with the second generation management information based on the first control information found in the first search step; and if it is found in the comparison step that the first generation management information matches the second generation management information, the found control information is sent as the first control information to the channel adapter.

8. The storage system control method according to claim 6, wherein the storage controller includes cache memory connected to the channel adapter,
wherein the cache memory includes a second storage unit for storing, as second control information, either the control information that should be stored in the event the storage controller stops, or the control information that exceeds the capacity of the shared storage unit and cannot be stored in the shared storage unit, and
wherein the execution step includes a second search step of searching for the second control information if the first control information cannot be found in the first search step; and the second control information found in the second search step is sent as the first control information to the channel adapter.

9. The storage system control method according to claim 6, wherein in the first storage step, the first control information is stored as grouped control information obtained by grouping plural sets of control information that should be stored in the event the storage controller stops, or plural sets of control information that exceeds the capacity of the shared storage unit and cannot be stored in the shared storage unit.

10. The storage system control method according to claim 7, wherein if it is found in the comparison step that the first generation management information does not match the second generation management information, the second control information is searched for in the second search step.

11. A storage controller for storing data from a host system for making a data read/write request, the storage controller comprising:
a channel adapter that is a communication interface with the host system; and
shared memory connected to the channel adapter;
wherein the shared memory includes a shared storage unit for storing control information for controlling the storage controller; and wherein the channel adapter includes:
a first storage unit for storing, as one or more sets of first control information, either the control information that should be stored in the event the storage controller stops, or the control information that exceeds the capacity of the shared storage unit and cannot be stored in the shared storage unit;
a first search unit for searching for necessary first control information in the one or more sets of first control information stored in the first storage unit; and
a processor for executing corresponding control processing based on the first control information found by the first search unit.

12. The storage controller according to claim 11, wherein the first storage unit stores first generation management information for managing updates of the first control information,
wherein the shared storage unit stores second generation management information for managing updates of either the control information that should be stored in the event the storage controller stops, or the control information that exceeds the capacity of the shared storage unit and cannot be stored in the shared storage unit, and
wherein the processor includes a comparator for comparing the first generation management information with the second generation management information based on the first control information found by the first search unit; and if the comparator finds that the first generation management information matches the second generation management information, the processor sends the found control information as the first control information to the first storage unit.

13. The storage controller according to claim 11, wherein the storage controller includes cache memory connected to the channel adapter,
wherein the cache memory includes a second storage unit for storing, as second control information, either the control information that should be stored in the event the storage controller stops, or the control information that exceeds the capacity of the shared storage unit and cannot be stored in the shared storage unit, and
wherein the processor includes a second search unit for searching for the second control information if the first control information cannot be found by the first search unit; and the processor sends, as the first control information, the second control information found by the second search unit to the first storage unit.

14. The storage controller according to claim 11, wherein the first control information is grouped control information obtained by grouping plural sets of control information that should be stored in the event the storage controller stops, or plural sets of control information that exceed the capacity of the shared storage unit and cannot be stored in the shared storage unit.

15. The storage system according to claim 12, wherein if the comparator finds that the first generation management information does not match the second generation management information, the second search unit searches for the second control information.

* * * * *